US006304800B1

(12) United States Patent
Ishihara et al.

(10) Patent No.: US 6,304,800 B1
(45) Date of Patent: Oct. 16, 2001

(54) METHODS, APPARATUS AND COMPUTER PROGRAM PRODUCTS FOR AUTOMATED RUNWAY SELECTION

(75) Inventors: Yasuo Ishihara, Everett; Scott Gremmert, Redmond, both of WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/454,924

(22) Filed: Dec. 3, 1999

Related U.S. Application Data

(60) Provisional application No. 60/111,952, filed on Dec. 11, 1998.

(51) Int. Cl.[7] ............................ G08G 5/02; G01C 21/00

(52) U.S. Cl. ............................ 701/16; 701/18; 340/947; 340/951

(58) Field of Search ................................ 701/4, 5, 6, 14, 701/16, 17, 18, 122; 340/947, 948, 951, 979, 980

(56) References Cited

U.S. PATENT DOCUMENTS

| | | | | |
|---|---|---|---|---|
| 4,454,510 | * | 6/1984 | Crow | 343/5 GC |
| 4,890,232 | * | 12/1989 | Mundra | 701/120 |
| 4,994,810 | * | 2/1991 | Sinsky | 342/151 |
| 5,343,395 | | 8/1994 | Watts | 364/428 |
| 5,526,265 | * | 6/1996 | Nakhla | 701/16 |
| 5,610,616 | * | 3/1997 | Vallot et al. | 342/357 |
| 5,712,785 | * | 1/1998 | Mok et al. | 701/16 |
| 5,745,054 | | 4/1998 | Wilkens | 340/972 |
| 5,831,570 | * | 11/1998 | Ammar et al. | 342/26 |
| 5,839,080 | | 11/1998 | Muller et al. | 701/9 |
| 5,892,462 | * | 4/1999 | Tran | 340/961 |

FOREIGN PATENT DOCUMENTS

| | | | |
|---|---|---|---|
| 0 674 300 A1 | 9/1995 | (EP) | G08G/5/02 |
| 0 717 330 A1 | 6/1996 | (EP) | G05D/1/06 |
| 0 750 238 A1 | 12/1996 | (EP) | G05D/1/06 |

OTHER PUBLICATIONS

Blasch E P: "Learning Attributes For Situational Awareness In The Landing Of An Autonomous Airplane"; 16th DASC. AIAA/IEEE Digital Avionics Systems Conference, Reflections to The Future. Proceedings (Cat. No. 97CH36116), Irvine, CA, Oct. 26–30, 1997, pp. 5.3–1–8 vol. 1, XP002141739 1997, New York, NY, USE, IEEE, USA. ISBN: 0–7803–4105–3.

* cited by examiner

*Primary Examiner*—Tan Nguyen

(57) ABSTRACT

The present invention provides several apparatus, methods, and computer program products for predicting which one of at least two candidate runways on which an aircraft is most likely to land, such that data concerning the predicted runway may be used by ground proximity warning systems. The present invention includes a processor that receives data pertaining to an aircraft and at least two candidate runways in close proximity to the aircraft. Based on this data, the processor of the present invention determines a reference deviation angle between the aircraft and each candidate runway. This reference deviation angle may represent a bearing, track, or glideslope deviation angle between the aircraft and each candidate runway. The processor further evaluates each of the reference deviation angles and predicts which of the candidate runways the aircraft is most likely to land. For instance, in one embodiment, the processor compares the reference deviation angle value associated with each candidate runway to the reference deviation angle associated with the other candidate runways. In another embodiment, the processor may compare the reference angle deviation value associated with each candidate runway to an empirical likelihood model representing the likelihood that the aircraft is landing on the candidate runway based on the reference deviation angle. In this embodiment, the processor evaluates the likelihood value generated for each candidate runway and predicts which runway the aircraft is most likely to land. In another embodiment of the present invention, the processor may predict the runway based on a combination of likelihood values for each candidate runway (i.e., bearing, track, and glideslope likelihood).

64 Claims, 6 Drawing Sheets

METHODS, APPARATUS AND COMPUTER PROGRAM PRODUCTS FOR AUTOMATED RUNWAY SELECTION

CROSS REFERENCE TO RELATED APPLICATION

This application claims priority from U.S. provisional Application Ser. No. 60/111,952 filed Dec. 11, 1998.

FIELD OF THE INVENTION

The present invention relates generally to ground proximity warning systems for use in aircraft. More particularly, the apparatus, methods, and computer program products of the present invention relate to predicting a runway on which an aircraft is most likely to land, to thereby increase the accuracy of ground proximity warning systems.

BACKGROUND OF THE INVENTION

An important advance in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions with terrain or other obstacles. Although these warning systems are quite useful in providing the flight crew with information concerning potential problems with the navigation of the aircraft, the usefulness of these systems must be balanced against problems associated with providing false alerts to the flight crew that may cause the flight crew to ignore alarms from the ground proximity warning system altogether.

For example, during the landing operation of the aircraft, the aircraft will follow a flight path that will eventually intersect the earth at the intended runway on which the aircraft is scheduled to land. In the landing operation, ground proximity warning systems, if not adequately controlled, may generate constant alarms. The constant generation of alarms during landing may be a nuisance due to the added stress and confusion the alarms may impose on the flight crew. Additionally, the nuisance alarms may overshadow other critical alarms in the cockpit. For this reason, some ground proximity warning systems anticipate the landing of the aircraft and disable or desensitize alarms otherwise generated by the warning system within a predetermined range of the airport, such that the ground proximity warning system will not generate nuisance alarms during landing of the aircraft.

Although disabling or desensitizing of alarms generated by the ground proximity warning system during landing eliminates problems associated with the generation of "nuisance" warning alarms, determining when to disable the ground proximity warning system also presents several problems. Specifically, several airports are located in geographic areas that are in close proximity to either natural high elevation terrain such as mountains and/or manmade terrain such as skyscrapers. Premature disablement or desensitization of alarms of the ground proximity warning system may disadvantageously eliminate ground proximity protection from these features near the airport.

However, operating the ground proximity warning system in close proximity to the airport may also cause problems. Specifically, if the ground proximity warning system is operated conservatively and the alarms remain enabled in close proximity to the airport, the ground proximity warning system is more likely to give nuisance alarms, mistaking the aircraft trajectory intersection with the runway as requiring a ground proximity alert. In these instances, the flight crew may become desensitized to the alarm and associate the alarm with the impending landing of the aircraft, instead of the terrain surrounding the airport.

Various ground proximity warning systems have been designed that attempt to detect when the aircraft is entering a landing procedure such that the alarms of the ground proximity warning systems may be disabled or desensitized in a more timely and sophisticated manner. For example, some ground avoidance systems monitor the flaps and landing gear systems of the aircraft to determine if these systems are operating in a characteristic landing configuration. Other systems monitor the rate of descent and air speed of the aircraft to determine whether the aircraft is landing.

Although these systems are designed to determine when the aircraft is beginning a landing procedure, these systems may at times be unreliable, because configurations of the flaps, landing gear, air speed, and rate of descent that may appear to be part of a landing procedure, may also be configurations used in normal flight of the aircraft. Additionally, use of flap and landing gear configurations as indications of landing may cause the ground proximity warning system to not timely disable or desensitize the alarms. Specifically, because the flight crew typically configures the flaps and landing gear, the timing of the configuration of the flaps and landing gear may be different for each landing. Thus, the warning alarms of the ground proximity warning system may either remain enabled for too long and produce unwanted nuisance alarms during a portion of the landing procedure, or the alarms of the ground proximity warning system may be disabled too early and not provide adequate protection from terrain near the airport.

Other ground proximity warning systems have been developed that evaluate the proximity of the aircraft to an airport and the flight altitude of the aircraft above the runway to determine if the aircraft is entering a landing procedure. For example, one ground proximity warning system monitors the altitude of the aircraft in relation to the runway closest to the aircraft. If the aircraft approaches the runway within a predetermined distance range and within a predetermined altitude range, the ground proximity warning system will determine that the aircraft is entering a landing procedure. During the landing procedure, the ground proximity warning system creates a terrain floor surrounding the runway. The generation of the terrain floor is discussed in detail in U.S. Pat. No. 5,839,080, entitled "Terrain Awareness System" which is assigned to the assignee of the present application. The contents of U.S. Pat. No. 5,839,080 are incorporated herein by reference.

As detailed in U.S. Pat. No. 5,839,080, the terrain floor represents minimum altitudes required by the aircraft at certain distances from the runway in order to safely approach the runway according to conventional landing procedures. Additionally, the terrain floor includes an area immediately adjacent to the runway where the alarms of the ground proximity warning system are not generated, such that the ground proximity warning system does not generate nuisance alarms during the final approach of the aircraft to the runway. This ground proximity warning system provides several advantages as it does not require the monitoring of landing gears and flaps, but instead monitors the positional relationship between the airport and the aircraft.

Although the above mentioned ground proximity warning system provides several advantages, there may be instances where the use of the closest runway to the aircraft in the creation of the terrain floor may not provide desired accuracy for the operation of the ground proximity warning system. Specifically, there may be instances where the aircraft approaches the airport from one direction with intentions of landing on a runway on the opposite side of the airport. In these instances, the above-mentioned ground proximity warning system may choose the closest runway to the aircraft as the aircraft approaches the airport and may disable or desensitize the alarms of the ground proximity warning system based on the distance and altitude relationship between the aircraft and the closest runway, instead of the intended landing runway. As such, the ground proximity warning system may prematurely disable or desensitize the alarms, thereby possibly not providing maximum ground proximity warning protection in the area close to the runway where the aircraft is intending to land.

An additional problem may be experienced where two airports at different elevations above sea level are located in close proximity to one another, and an aircraft flies near one airport at low altitude in route to the second airport. In these instances, as the aircraft flies near the first airport located at one elevation above sea level, the ground proximity warning system will use the closest runway of the first airport in the creation of the terrain floor. Based on the distance from the closest runway, the ground proximity warning system will provide certain indications to the flight crew of the aircraft, such as terrain caution and terrain warning alerts and a display that depicts the surrounding terrain that is colored to reflect the aircraft's proximity to the terrain based upon the incorrect assumption that the aircraft is landing at the closet runway at the first airport. However, when the aircraft flies past the first airport in route to land at the second airport, the ground proximity warning system will choose the closest runway at the second airport that is located at a different elevation above sea level than the previous selected runway. The change in elevation between the two different runways used in the ground proximity warning calculations may cause the system to dramatically alter the manner in which the surrounding terrain is colored upon the display so as to confuse and possibly alarm the flight crew. In addition, any terrain caution or terrain warning alerts generated based upon the incorrect assumption that the aircraft was landing at the first airport may very well be erroneous for an aircraft landing at the second airport.

SUMMARY OF THE INVENTION

As set forth below, the apparatus and method of the present invention may overcome many of the deficiencies identified with the selection of a runway for use in creating a terrain floor and for generating terrain caution and terrain warning alerts in a ground proximity warning system. In particular, the present invention provides several apparatus and methods for predicting on which runway an aircraft is most likely to land such that this predicted runway, and not necessarily the closest runway, can be used by the ground proximity warning system. Knowing on which runway the aircraft is most likely to land allows a ground proximity warning system to more accurately generate a terrain floor which, in turn, defines the region in which alarms will not be generated such that the warning system may provide maximum safety coverage around the area of the airport without creating an unacceptable number of nuisance alarms.

Additionally, by predicting which runway the aircraft is most likely to land, the ground proximity warning system can reduce instances in which terrain caution and terrain warning alerts are generated and the display of the surrounding terrain is colored based upon the closest runway at a first airport when the aircraft is actually only flying near the first airport in route to a second airport. Specifically, because the present invention will most likely predict that a runway located at the second airport is the runway that the aircraft is most likely to land, the ground proximity warning system will not generate terrain caution and terrain warning alerts and will not color the display based upon the runways of the first airport.

The present invention provides several embodiments for predicting which runway from a group of candidate runways that an aircraft is most likely to land. For example, one embodiment of the present invention provides an apparatus, method, and computer program product for predicting which one of at least two candidate runways an aircraft is most likely to land. The apparatus of this embodiment includes a processor that accesses data relating to the aircraft and each of the candidate runways. In operation, the processor analyzes the data relating to each candidate runway and the aircraft and determines a reference angle deviation between the aircraft and each candidate runway. Based on the reference angle deviation associated with each candidate runway, the processor predicts the candidate runway on which the aircraft is most likely to land. The coordinates of the predicted runway are subsequently used by a ground proximity warning system to generate a terrain floor surrounding the predicted runway. This terrain floor is subsequently used by the ground proximity warning system to provide alarms to the flight crew, and also to identify the region in which no alarms should be generated during the final approach of the aircraft.

As discussed above, the present invention evaluates each candidate runway based on a reference angle deviation between the aircraft and each candidate runway. Depending upon the embodiment, the reference angle deviation between the aircraft and each candidate runway may represent several alternative angular relationships between the aircraft and each candidate runway. For instance, in one embodiment of the present invention, the reference angle deviation determined by the processor for each candidate runway may represent a bearing angle deviation. Bearing angle deviation in this embodiment is defined as an angle of deviation between the position (i.e., latitude and longitude) of the aircraft and the position of each candidate runway. In this embodiment of the present invention, the processor accesses data relating to the position of each candidate runway and the current position of the aircraft. Based on the relative positions of each candidate runway and the aircraft, the processor determines a bearing angle deviation between the aircraft and each candidate runway. The processor next analyses the bearing angle deviation associated with each candidate runway and predicts which runway the aircraft is most likely to land.

Similarly, in another embodiment of the present invention, the reference angle deviation between the aircraft and each candidate runway may represent a track angle deviation. Track angle deviation is defined in this embodiment as an angle of deviation between a direction in which the aircraft is flying and a direction in which each candidate runway extends lengthwise. In this embodiment of the present invention, the processor accesses data relating to the direction in which the aircraft is flying and information for each candidate runway relating to the direction in which each candidate runway extends lengthwise. Based on this data, the processor determines a track angle deviation between the aircraft and each candidate runway. The processor next analyzes the track angle deviation associated with each candidate runway and predicts which runway the aircraft is most likely to land.

Further, in another embodiment of the present invention, the reference angle deviation between the aircraft and each candidate runway may represent a glideslope angle deviation. Glideslope angle deviation is defined in this embodiment as a vertical angle of deviation between the position of the aircraft and each candidate runway. Specifically, the glideslope angle relates to the approach angle of the aircraft in relation to the runway. Typically, when landing, and aircraft will approach the runway within a predetermined range of angles. Approach angles above this range are typically considered unsafe for landing. As such, an aircraft that has a vertical angle with respect to the runway that is within the predetermined range of angles is more likely to be landing on the runway, and likewise, an aircraft that has a vertical angle with respect to the candidate runway that is greater than the predetermined range of angles is most likely not landing on the candidate runway.

In this embodiment of the present invention, the processor accesses data relating to the position of the aircraft and position information for each candidate runway. Based on this data, the processor determines a glideslope angle deviation between the position of the aircraft and each candidate runway. The processor next analyses the glideslope angle deviation associated with each candidate runway and predicts which runway the aircraft is most likely to land.

As briefly discussed above, the present invention provides an apparatus, method, and computer program product that predict which runway an aircraft is most likely landing based on an analysis of the reference angle between the aircraft and each candidate runway. Although many different criteria may be used in analyzing the reference angle associated with each candidate runway, in some embodiments, it is advantageous to use an empirical method for predicting which runway the aircraft is most likely landing. In this embodiment of the present invention, the processor compares the reference angle associated with each candidate runway to a likelihood model. The likelihood model is an empirical model that represents the likelihood that an aircraft is landing on a candidate runway based on the reference angle between the runway and the aircraft. In one embodiment of the present invention, the candidate runway having an associated reference angle that, when applied to the likelihood model, produces the greatest likelihood value is predicted as being the runway on which the aircraft is most likely landing.

As discussed earlier, the present invention in some embodiments, may evaluate a bearing, track, or glideslope angle deviation. Depending on the embodiment, the likelihood model may represent the likelihood that an aircraft will land on a candidate runway based on differing criteria. Specifically, in embodiments, which evaluate the bearing angle deviation between the aircraft and each candidate runway, the likelihood model will represent the likelihood that an aircraft will land on a candidate runway based on the bearing angle deviation between the aircraft and the runway. Likewise, in the embodiment in which the present invention evaluates the track angle deviation between the aircraft and each candidate runway, the likelihood model will represent the likelihood that an aircraft will land on a runway based on the track angle of deviation between the aircraft and the runway. Similarly, in the embodiment in which the present invention evaluates the glideslope angle deviation between the aircraft and each candidate runway, the likelihood model will represent the likelihood that an aircraft will land on a candidate runway based on the glideslope angle of deviation between the aircraft and the runway.

As discussed above, the present invention provides differing embodiments that predict which runway an aircraft is most likely to land based on either bearing, track, or glideslope angle deviation between the aircraft and each candidate runway. In an additional embodiment, the present invention provides apparatus, methods, and computer program product that predict a runway on which the aircraft is most likely to land based on both the bearing and track angle deviation between the aircraft and each candidate runway. Specifically, as an aircraft approaches a set of candidate runways, it will have both a bearing angle deviation representing an angular positional difference between each candidate runway and the aircraft and a track angle deviation representing an angular directional difference between the direction in which the aircraft is flying and the direction in which each candidate runway extends lengthwise. In this embodiment of the present invention, the processor determines both a bearing and a track angle deviation between each candidate runway and the aircraft. The processor next predicts which runway the aircraft is most likely to land based on both the bearing and track angle deviation associated with each candidate runway.

As mentioned above, in many cases, the aircraft will also approach each candidate runway within a predetermined range of glideslope angles, such that if the aircraft has a vertically angular position with respect to the candidate runway that is, within the predetermined range of glideslope angles, it is more likely that the aircraft is landing on the candidate runway. As such, in this embodiment of the present invention, the processor determines the bearing, track, and glideslope angle deviation between each candidate runway and the aircraft. The processor next predicts which runway the aircraft is most likely to land based on the bearing, track, and glideslope angle deviation associated with each candidate runway.

Although many different criteria may be used in predicting the runway on which the aircraft is most likely to land based on the bearing, track, and glideslope angle deviation, in one embodiment of the present invention, the processor may use an empirical method for predicting which runway the aircraft is most likely landing. As discussed above in relation to previous embodiments, the processor of this embodiment determines a bearing, a track, and a glideslope deviation angle for each candidate runway. Additionally, processor compares the bearing deviation angle for each candidate runway to a bearing likelihood model, the track deviation angle to a track likelihood model, and the glideslope deviation angle to a glideslope likelihood model. From each comparison, the processor generates bearing, track, and glideslope likelihood values for each candidate runway. These likelihood values are subsequently used by the present invention to determine on which runway the aircraft is most likely landing.

Specifically, depending on the embodiment, the processor may predict which runway the aircraft is most likely to land based on the bearing, track, and glideslope likelihood value in several different ways. For example, in one embodiment of the present invention, the processor may compare the bearing, track, and glideslope likelihood values for each candidate runway to the bearing, track, and glideslope likelihood values of the other candidate runways. In other embodiments, however, the processor may combine either two or all of the likelihood values together for each candidate runway to create a combined likelihood value for each candidate runway that can be compared to the combined likelihood values for each of the other candidate runways. In this regard, the processor may either sum or multiply either two or all of the likelihood values together for each candidate runway to create a combined likelihood value which can be compared to the combined likelihood values for each of the other candidate runways.

In addition to the reference angle deviation between the aircraft and a candidate runway, other data concerning the aircraft and candidate runway may also be of importance in predicting which runway an aircraft is most likely to land. Specifically, the altitude of the aircraft as it approaches each candidate runway may also aid in determining on which of the candidate runways that the aircraft is most likely to land. For instance, if an aircraft's altitude in relation to a candidate runway either exceeds or is less than a predefined acceptable approach envelope, the aircraft is most likely not landing on the candidate runway. As such, in some embodiments of the present invention, the processor in addition to evaluating a reference angle associated with each candidate runway also evaluates the altitude and distance of the aircraft from each candidate runway. If the aircraft is not within a predefined acceptable approach envelope, the processor will determine that the aircraft is not landing on the candidate runway and will not further analyze the candidate runway in relation to the aircraft.

As discussed, the apparatus of the present invention predicts which runway the aircraft is most likely to land based on either one or several likelihood values, (i.e., bearing, track, and glideslope), associated with each candidate runway. In many instances, the apparatus of the present invention will select the candidate runway having the greatest likelihood value as the runway on which the aircraft is most likely to land. However, in some instances, the candidate runway with the greatest likelihood value may not be the best choice. For instance, in some embodiments, the aircraft may either be positioned on or near one of the candidate runways. In this embodiment, it may be advantageous to select the candidate runway on which the aircraft is "on" for ground proximity warning calculations.

Additionally, in some instances, the aircraft may be positioned with respect to the candidate runways, such that it is initially indeterminate as to which of the candidate runways the aircraft is most likely to land. In this instance, the apparatus of the present invention may further analyze the candidate runways having reference angle deviations with respect to the aircraft that make it indeterminate as to which of the candidate runways the aircraft is most likely to land. The apparatus of the present invention will select the indeterminate candidate runway that is closest to the aircraft.

By analyzing the position of each candidate runway of a set of candidate runways to the position of an aircraft, the apparatus of the present invention can predict the runway on which the aircraft is most likely to land. The coordinates of this predicted runway can, in turn, be used by a ground proximity warning system to provide a better estimate of the location on which the aircraft is most likely to land. Knowing this information allows a ground proximity warning system to more accurately define the terrain floor used to warn the flight crew of potential problems and also to define the region in which no alarms will be generated, such that it may provide maximum coverage without creating an unacceptable number of nuisance alarms.

Additionally, using the predicted runway in the ground proximity warning system eliminates some of the problems associated with an aircraft that flies near one airport in route to a second airport. Specifically, because the runways of the first airport that the aircraft first flies near will most likely not have associated bearing and track angle deviations that make the runways more likely for landing than the runways of the second airport, the ground proximity warning system will not select one of the runways from the first airport for use in the ground proximity calculations.

Thus, the ground proximity warning system will not initially generate terrain caution and terrain warning alerts and will not initially color the terrain depicted by a display based upon a runway at the first airport. As such, the ground proximity warning system will not experience abrupt changes by abruptly switching from a runway at the first airport to a runway at the second airport, as the runway at the second airport becomes closer.

DETAILED DESCRIPTION OF THE INVENTION

Figure 1:
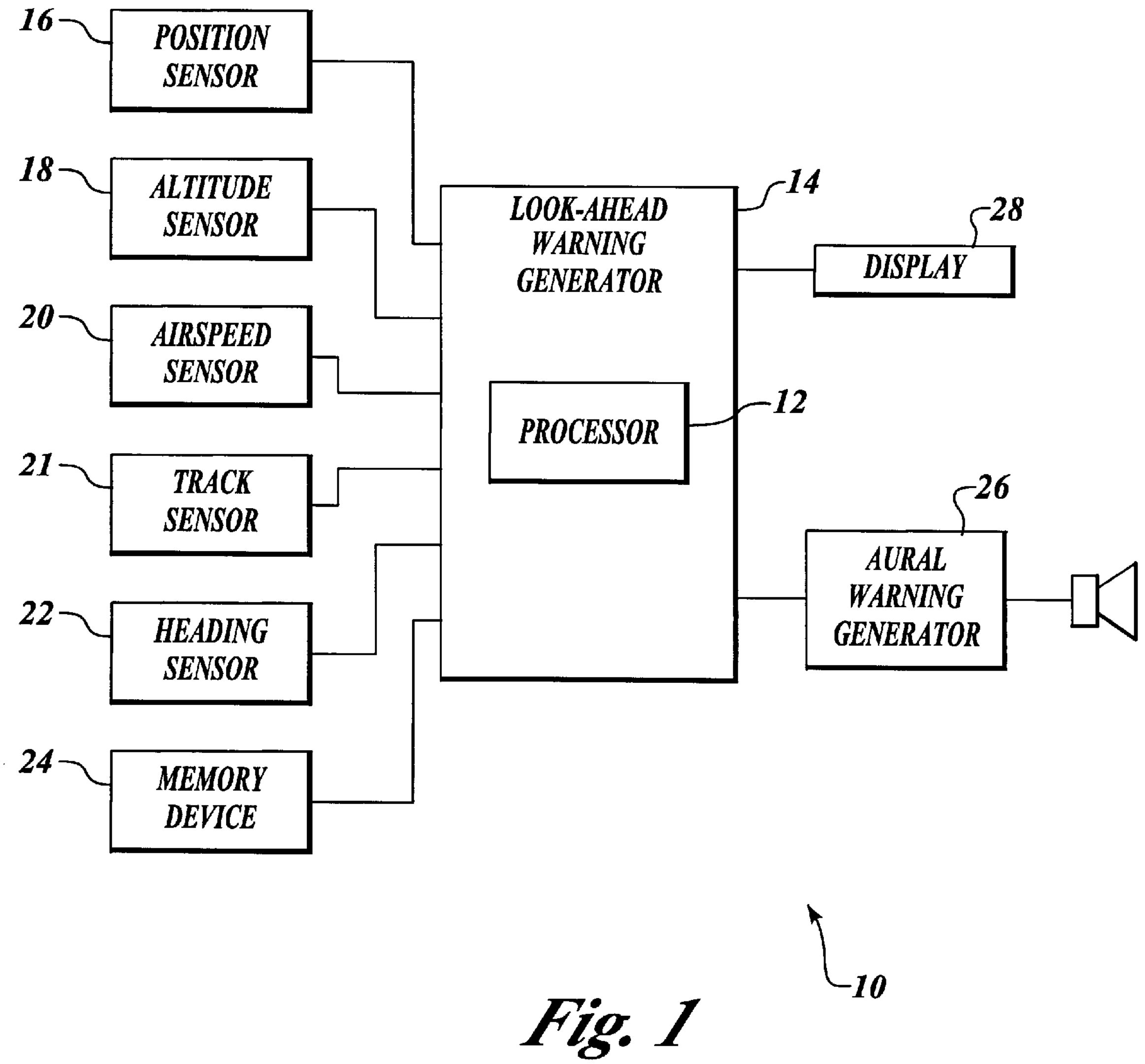
FIG. 1 is a block diagram of an apparatus for predicting which of at least two candidate runways that an aircraft is most likely to land according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, the present invention provides various apparatus, methods, and computer program products for predicting, from a set of candidate runways, the runway that an aircraft is most likely to land. Information relating to the predicted runway can be used subsequently by ground proximity warning systems to create terrain clearance floors used to alert flight crew concerning terrain in close proximity to the aircraft, to generate caution and warning terrain envelopes, and to create appropriately colored displays of the terrain surrounding the aircraft. By predicting which runway the aircraft is most likely to land, the ground proximity warning system may provide more accurate ground proximity warning coverage both in flight and in the area surrounding the airport, without a substantial increase in the number of nuisance alarms.

Additionally, use of the predicted runway by a ground proximity warning system may also alleviate some of the problems associated with the flight of aircraft into an airport that is in close proximity to another airport, where both airports are at different elevations above sea level. Specifically, by predicting the runway on which the aircraft is most likely to land, the ground proximity warning system will most likely not base the ground proximity warning calculations on a runway of the first airport which the aircraft flies near in route to the second airport, where the aircraft is landing. By not basing the ground proximity warning calculations on a runway from the first airport, the ground warning proximity system will not abruptly switch from producing alerts based upon a runway at the first airport at one elevation to a runway at the second airport at a different elevation.

With relation to the description of the various embodiments of the present invention provided in detail below, it must be understood that the present invention can be used with any system that uses information concerning runways for system calculations. However, the various apparatus, methods, and computer program products of the present invention have been illustrated below with reference to the ground proximity warning system of U.S. Pat. No. 5,839,080 for illustrative purposes. As this disclosure is for illustrative purposes only, the scope of the present invention should not be limited to the systems described below, as the concepts and designs described below may be implemented in any type of system that uses runway information.

Referring now to FIG. 1, an apparatus 10 for predicting from at least two candidate runways which runway an aircraft is most likely to land according to one embodiment of the present invention is depicted in conjunction with the ground proximity warning system of U.S. Pat. No. 5,839,080. FIG. 1 depicts many of the components of the ground proximity warning system of U.S. Pat. No. 5.839,080 in simplified block form for illustrative purposes, however, it is understood that the functions of these blocks are consistent with and contain many of the same components as the ground proximity warning system described in U.S. Pat. No. 5,839,080.

Specifically, the ground proximity warning system of this embodiment includes a look-ahead warning generator 14 that analyzes terrain and aircraft data and generates terrain profiles surrounding the aircraft. Based on these terrain profiles and the position, track, and ground speed of the aircraft, the look-ahead warning generator generates aural and/or visual warning alarms related to the proximity of the aircraft to the surrounding terrain. Some of the sensors that provide the look-ahead warning generator with data input concerning the aircraft are depicted in FIG. 1. Specifically, the look-ahead warning generator receives positional data from a position sensor 16. The position sensor may be a portion of a global positioning system (GPS), inertial navigation system (INS), or flight management system (FMS). The look-ahead warning generator also receives altitude and airspeed data from an altitude sensor 18 and airspeed sensor 20, respectively, and aircraft track and heading information from track 21 and heading 22 sensors, respectively.

In addition to receiving data concerning the aircraft, the look-ahead warning system also receives data concerning the terrain surrounding the aircraft. Specifically, the look-ahead warning generator is also connected to a memory device 24 that contains a searchable data base of data relating, among other things, to the position and elevation of various terrain features and also elevation, position, and quality information concerning runways.

In normal operation, the look-ahead warning generator receives data concerning the aircraft from the various sensors. Additionally, the look-ahead warning generator accesses terrain and airport information from the memory device concerning the terrain surrounding the aircraft and runways in close proximity to the aircraft's current position. Based on the current position, altitude, speed, track, etc. of the aircraft, the look-ahead warning generator generates terrain warning and caution envelopes and generates alerts via either an aural warning generator 26 and/or a display 28 as to terrain that penetrate the terrain warning and caution envelopes. In addition, the look-ahead warning generator generates a terrain clearance floor and produces alerts if the aircraft falls below the terrain clearance floor, such as during landing.

Importantly, part of the generation of the terrain clearance floor is the selection of a runway. The terrain floor surrounding the runway represents the minimum altitudes required by the aircraft at certain distances from the selected runway in order to avoid possible collisions with terrain, if the aircraft were to land on the runway. The terrain floor surrounding the runway also includes an area immediately adjacent to the runway, where no alarms are generated such that the ground proximity warning system does not generate nuisance alarms during the final approach of the aircraft to the runway.

As discussed previously, some ground proximity warning systems typically select the runway closest to the aircraft as the runway used to generate the terrain clearance floor. Although selection of the runway closest to the aircraft provides acceptable information for generating the terrain clearance floor, in some instances, it may be advantageous to predict which runway that the aircraft is most likely to land and use the information related to this predicted runway for terrain clearance floor generation, thereby providing more accurate estimates of the proximity of the aircraft to the terrain. Further, by using information relating to the predicted runway in terrain floor generation, the area immediately adjacent to the runway, where either no alarms are generated or the alarms are desensitized, can be more accurately determined. By more accurately determining the terrain floor, the ground proximity warning system can provide maximum coverage area, while generating less nuisance alarms during the final approach of the aircraft to the runway.

As such, with reference to FIG. 1, an apparatus for predicting which runway of at least two candidate runways that an aircraft is most likely to land is illustrated. In one embodiment of the present invention, the apparatus includes a processor 12 located in the look-ahead warning generator. The processor may either be part of the processor of the look-ahead warning generator or it may be a separate processor located either internal or external to the look-ahead warning generator.

Figure 2:
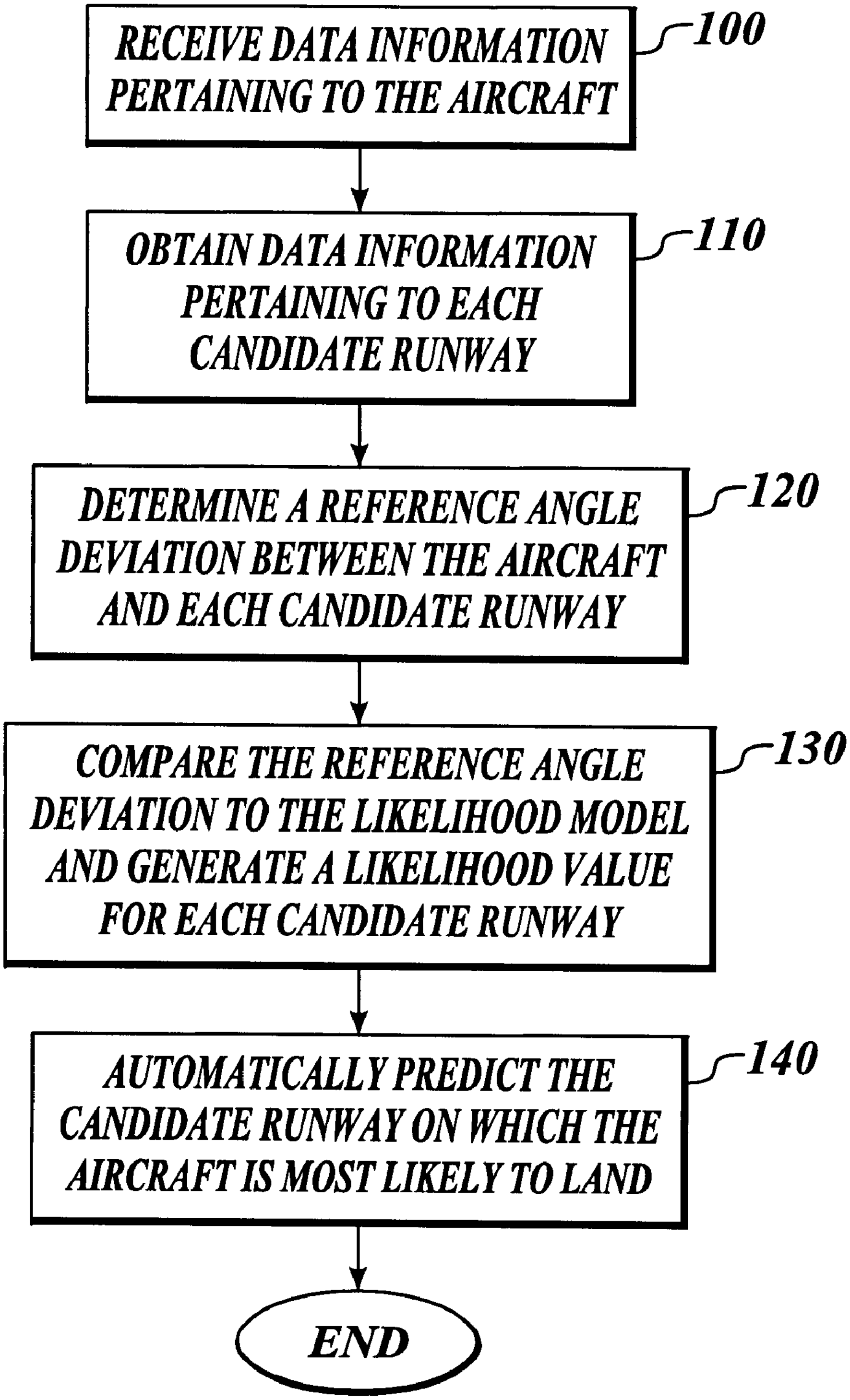
FIG. 2 is a block diagram of the operations performed to predict which of at least two candidate runways that an aircraft is most likely to land according to one embodiment of the present invention.

With reference to FIG. 2, to predict which runway the aircraft is most likely to land, the processor initially receives data from the various sensors pertaining to the aircraft. (See step 100). Additionally, the processor also accesses the memory device and obtains data relating to each candidate runway. (See step 110). Using the aircraft and candidate runway information, the processor determines a reference angle deviation between the aircraft and each candidate runway. (See step 120). Based on the reference angle deviation associated with each candidate runway, the processor automatically predicts the candidate runway on which the aircraft is most likely to land. (See step 140).

As discussed above, the processor of the present invention determines a reference angle of deviation between the aircraft and each candidate runway. Depending upon the embodiment, the reference angle deviation between the aircraft and each candidate runway may represent several alternative angular relationships between the aircraft and each candidate runway. Specifically, the prediction of whether an aircraft is intending to land on a particular runway may be determined based on the relationship of the position (i.e., latitude and longitude) of the aircraft with relation to the position of the candidate runway, the direction in which the aircraft is flying in relation to the direction in which the candidate runway extends, or the approach angle of the aircraft with relation to the candidate runway or a combination of these reference deviation angles.

Figure 3:
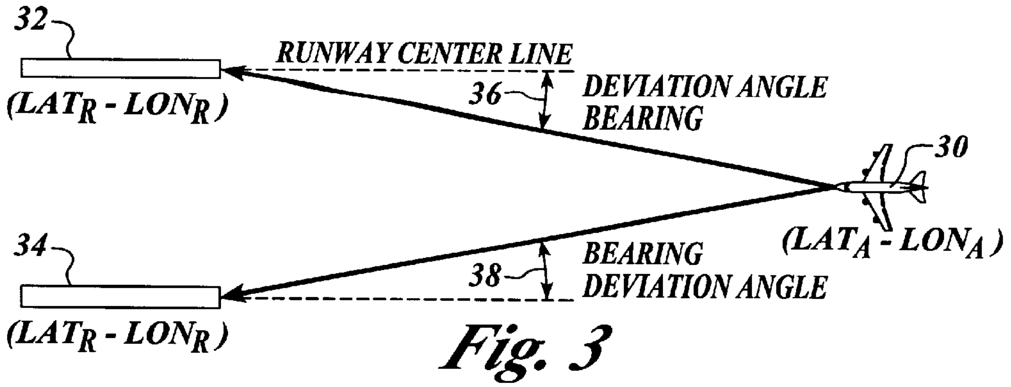
FIG. 3 is a top view illustrating graphically a bearing deviation angle between an aircraft and two candidate runways.

For example, in one embodiment of the present invention, the processor predicts which runway the aircraft is most likely to land based on a bearing angle deviation between the aircraft and at least two candidate runways. With reference to FIG. 3, bearing angle deviation is illustrated. FIG. 3 illustrates graphically the bearing angle deviation of an aircraft 30 from two candidate runways, 32 and 34, respectively. Bearing angle deviation represents the angle of deviation between the position (i.e., latitude and longitude) of the aircraft and the position (i.e., latitude and longitude) of each candidate runway. Specifically, bearing deviation angle 36 represents the angle deviation between the position of the aircraft 30 and the first runway 32, and bearing deviation angle 38 represents the angle deviation between the position of the aircraft 30 and the second runway 34.

To predict on which of the candidate runways that the aircraft is mostly likely to land, with reference to FIGS. 1 and 2, the processor initially receives position information pertaining to the current position (i.e., latitude and longitude) of the aircraft. (See step 100). Additionally, the processor also accesses the memory device and obtains position information relating to the position of each candidate runway. (See step 110). Using the aircraft and candidate runway position information, the processor determines a bearing deviation angle, 36 and 38, between the aircraft and each candidate runway. (See step 120). Based on the bearing deviation angle associated with each candidate runway, the processor automatically predicts the candidate runway on which the aircraft is most likely to land. (See step 140).

Figure 4:
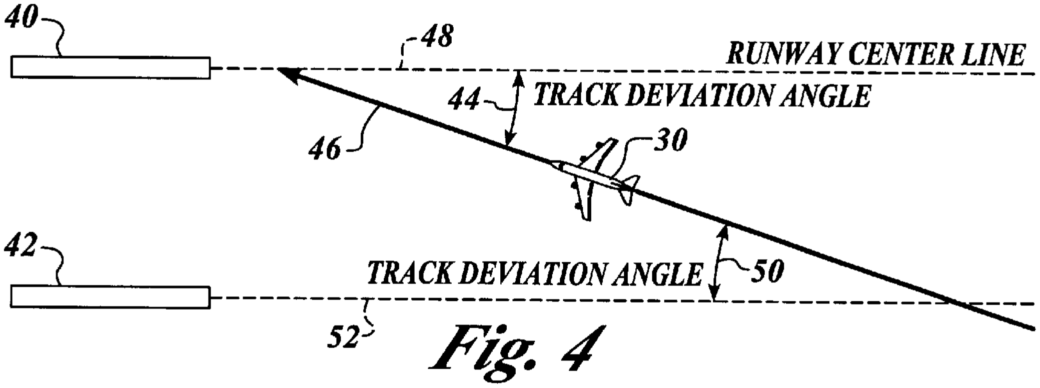
FIG. 4 is a top view illustrating graphically a track deviation angle between an aircraft and two candidate runways.

In addition to or instead of predicting the runway on which the aircraft is most likely to land based on bearing angle, the apparatus of the present invention may also predict the runway on which the aircraft is most likely to land based on the angle deviation between the direction in which the aircraft is heading (i.e., track) and the direction in which each candidate runway extends lengthwise. FIG. 4 illustrates graphically the track angle deviation of an aircraft 30 from two candidate runways, 40 and 42, respectively. Track angle deviation represents an angle of deviation between a direction in which the aircraft is flying and a direction in which each candidate runway extends lengthwise. Specifically, track angle deviation 44 represents the angle deviation between the direction 46 in which the aircraft 30 is flying and the lengthwise extension 48 of the first runway 40, and track angle deviation 50 represents the angle deviation between the direction 46 in which the aircraft 30 is flying and the lengthwise extension 52 of the first runway 42.

To predict which of the candidate runways that the aircraft is mostly to land, with reference to FIGS. 1 and 2, the processor initially receives track information pertaining to the current heading of the aircraft. (See step 100). Additionally, the processor also accesses the memory device and obtains information relating to the lengthwise extension of each candidate runway. (See step 110). Using the aircraft and candidate runway information, the processor determines a track angle deviation between the aircraft and each candidate runway. (See step 120). Based on the track angle deviation associated with each candidate runway, the processor automatically predicts the candidate runway on which the aircraft is most likely to land. (See step 140).

In addition to predicting the runway on which the aircraft is most likely to land based on bearing and track angle, the apparatus of the present invention may also predict the runway on which the aircraft is most likely to land based on the approach angle of the aircraft. Typically, when landing, and aircraft will approach the runway within a predetermined range of angles, such as about 0° to about 7°. Approach angles above this range are typically considered unsafe for landing. As such, an aircraft that has a vertical angle with respect to the runway that is within the predetermined range of angles is more likely landing on the candidate runway, and likewise, an aircraft that has a vertical angle with respect to the candidate runway that is greater than the predetermined range of angles is more likely not landing on the candidate runway. The approach angle is usually referred to as glideslope and represents a vertical angle of deviation between the position of the aircraft and each candidate runway.

Figure 5A:
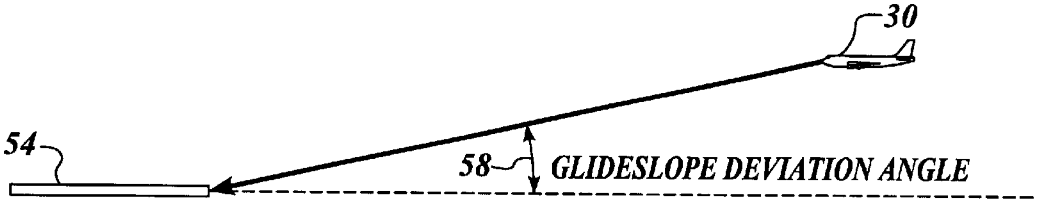
FIGS. 5A and 5B are side views respectively illustrating graphically a glideslope deviation angle between an aircraft and two candidate runways.
Figure 5B:
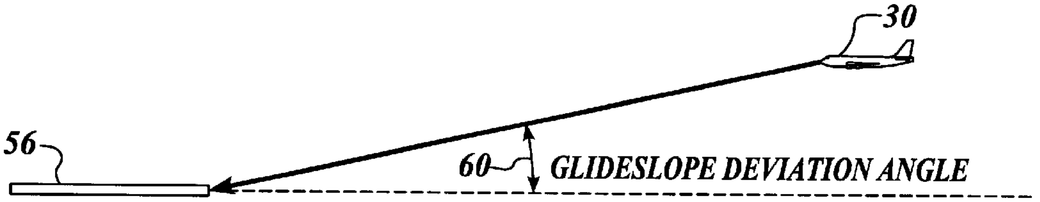

FIGS. 5A and 5B illustrate graphically the glideslope angle deviation of an aircraft 30 from two candidate runways, 54 and 56, respectively. Glideslope angle deviation represents a vertical angle of deviation between the position of the aircraft and each candidate runway. Specifically, glideslope angle deviation 58 represents the vertical angle deviation between the position of the aircraft 30 and the position of the first runway 54, and glideslope angle deviation 60 represents the vertical angle deviation between the position of the aircraft 30 and the position of the second runway 56.

To predict which of the candidate runways that the aircraft is mostly to land, with reference to FIGS. 1 and 2, the processor initially receives position and altitude information pertaining to the current position of the aircraft. (See step 100). Additionally, the processor also accesses the memory device and obtains position information relating to the each candidate runway. (See step 110). Using the aircraft and candidate runway information, the processor determines a glideslope angle deviation between the aircraft and each candidate runway. (See step 120). Based on the glideslope angle deviation associated with each candidate runway, the processor automatically predicts the candidate runway on which the aircraft is most likely to land. (See step 140).

As detailed above, the apparatus of the present invention may determine the bearing, track, and/or glideslope reference angle deviation between the aircraft and each candidate runway. Although the apparatus of the present invention may evaluate each candidate runway as one positional point (i.e., the center point of the runway), in some embodiments of the present invention, it is preferred to evaluate both endpoints of each candidate runway individually. Specifically, the end points of each candidate runway may have different angular relationships with respect to the position of the aircraft, and as such, it may be advantageous to evaluate each end point separately. For example, in one embodiment of the present invention, the memory device contains data relating to the position of the center point of the runway, information as to the length of each candidate runway, and quality information concerning runway quality and survey tolerances. This information is used to determine the reference deviation angle values between the aircraft and both ends of each candidate runway. In predicting which runway that the aircraft is most likely to land, the processor evaluates the reference deviation angle between the aircraft and both ends of each candidate runway.

As detailed above the present invention provides several apparatus and methods for predicting from at least two candidate runways, the runway that the aircraft is most likely to land. Specifically, the apparatus and method of the present invention predict the runway based on a bearing, track, or glideslope deviation angle between the aircraft and each candidate runway. Depending on the embodiment, the apparatus of the present invention may predict the runway on which the aircraft is most likely to land based on the reference angle deviation associated with each candidate runway in several different ways. For instance, in one embodiment of the present invention, the processor may predict that the runway having the smallest reference angle deviation with respect to the aircraft is the runway that the aircraft is most likely to land.

In another embodiment, however, the apparatus of the present invention may use an empirical method for predicting which runway the aircraft is most likely landing. In this embodiment of the present invention, the processor compares the reference deviation angle associated with each candidate runway to a likelihood model. The likelihood model is an empirical model that represents the likelihood that an aircraft is landing on a particular runway based on the reference deviation angle between the candidate runway and the aircraft. In this embodiment of the present invention, the candidate runway having an associated reference deviation angle that, when applied to the likelihood model, produces the greatest likelihood value is predicted as being the runway on which the aircraft is most likely to land.

Figure 6A:
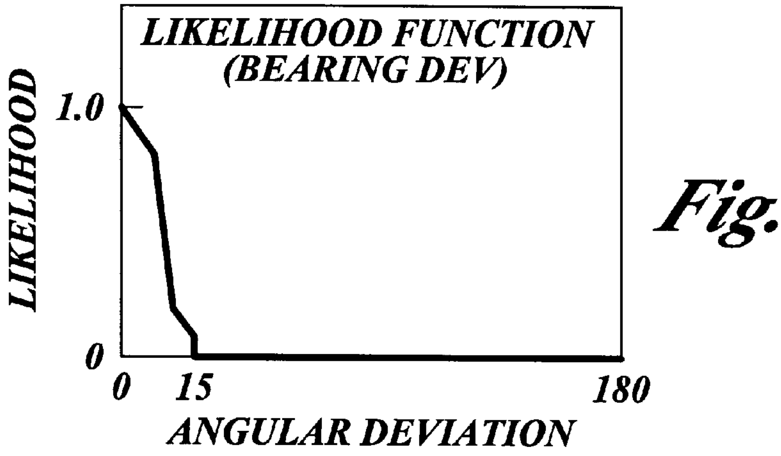
FIGS. 6A–6C respectively depict graphically a bearing, track, and glideslope likelihood model used for predicting which runway an aircraft is most likely to land according to one embodiment of the present invention.
Figure 6B:
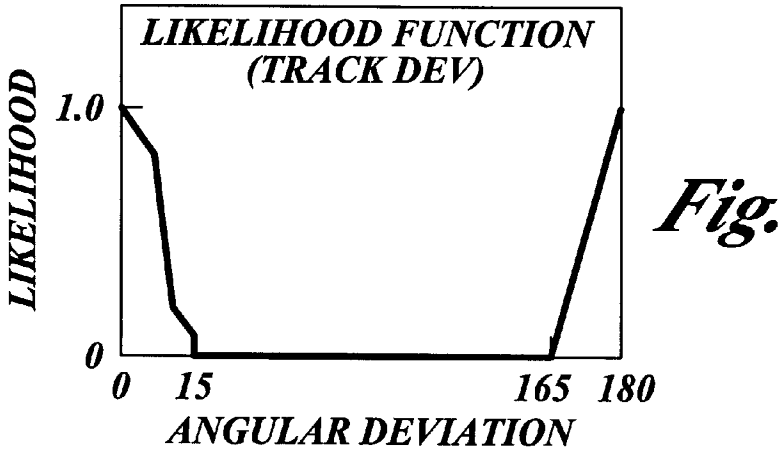
Figure 6C:
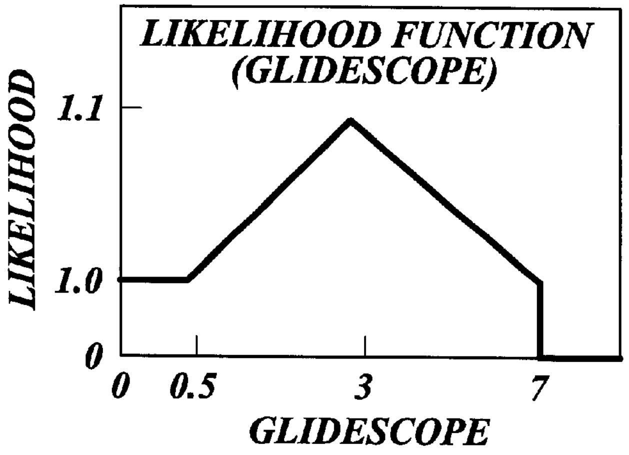

With reference to FIGS. 6A–6C, empirical likelihood models for bearing, track, and glideslope angle deviations are respectively illustrated. Each of these likelihood models represent the likelihood that an aircraft will land on a particular runway as a function of the reference deviation angle between the aircraft and the runway. By comparing the specific reference angle deviation associated with each candidate runway to the likelihood model, the apparatus of the present invention can determine the likelihood that the aircraft is landing on the candidate runway.

For example, FIG. 6A illustrates the likelihood that an aircraft will land on a candidate runway based on the bearing deviation angle between the aircraft and the runway. With reference to FIG. 2, to determine the likelihood that the aircraft will land on a particular runway using this likelihood model, the processor initially receives position information pertaining to the current position of the aircraft, (see step 100), and also accesses the memory device and obtains position information relating to the position of each candidate runway. (See step 110). Using the aircraft and candidate runway position information, the processor determines a bearing angle deviation between the aircraft and each candidate runway. (See step 120). Next, the processor compares the bearing angle deviation to the likelihood model and generates a likelihood value for each candidate runway. (See step 130). Based on the bearing likelihood value associated with each candidate runway, the processor automatically predicts the candidate runway on which the aircraft is most likely to land. (See step 140).

With reference to FIGS. 2, 6B, and 6C, similar steps would be performed to determine the likelihood that an aircraft would land on a candidate runway based on track and glideslope angle deviation, respectively.

As detailed above, the processor compares the reference angle deviation value to the likelihood model and determines a likelihood value. (See step 130). Although the likelihood value may be determined by graphic comparison to the likelihood model, in some instances it is advantageous to reduce the likelihood model to a series of mathematical functions that can be implemented in software to define, in piecewise form, the likelihood model. The mathematical piecewise functions for the bearing, track, and likelihood models are detailed below.

With reference to FIG. 2, to determine the likelihood value for each candidate runway using the mathematical model provided below, the processor compares the reference angle deviation value (i.e., either bearing, track, or glideslope) to the appropriate set of mathematical functions for the corresponding likelihood model and determines a likelihood value for the candidate runway. (See step 130).

With reference to FIG. 6A, the bearing likelihood model is illustrated mathematically as follows:

Bearing Likelihood Model

If Bearing Angle Deviation<5°
  Likelihood (Bearing Angle Deviation)=−0.02×Bearing Deviation+1.0
Else If Bearing Angle Deviation<10°
  Likelihood (Bearing Angle Deviation)=−0.1284×Bearing Deviation+1.542
Else If Bearing Angle Deviation<15°
  Likelihood (Bearing Angle Deviation)=−0.0296×Bearing Deviation+0.554
Else
  Likelihood (Bearing Angle Deviation)=0.0

As illustrated, in instances where the aircraft has a bearing angle deviation with respect to a candidate runway that is in the range of 0° to 15°, there is an increased likelihood that the aircraft will land on the candidate runway, while bearing deviation angle values that are greater than 15° have a decreased likelihood.

With reference to FIG. 6B, the track likelihood model is illustrated mathematically as follows:

Track Likelihood Model

If Track Angle Deviation<5°
  Likelihood (Track Angle Deviation)=−0.02×Track Deviation+1.0
Else If Track Angle Deviation<10°
  Likelihood (Track Angle Deviation)=−0.1284×Track Deviation+1.542
Else If Track Angle Deviation<15°
  Likelihood (Track Angle Deviation)=−0.0296×Track Deviation+0.554
Else If Track Angle Deviation>165° AND Distance Aircraft to Runway<4 Nm
  Likelihood (Track Angle Deviation)=$\frac{1}{15}$×Track Deviation−11.0
Else
  Likelihood (Track Angle Deviation)=0.0

As illustrated, the track likelihood model has similar characteristics to the bearing likelihood model for track deviation angle ranges between 0° and 15° and ranges 15° to 165°. However, unlike the bearing likelihood model for track deviation angles greater than 165° the track likelihood model demonstrates increased likelihood values as the track deviation angle value approaches 180°. This increased likelihood portion of the model represents the situation where the aircraft has just departed from the candidate runway instead of approaching the runway for landing.

Specifically, in instances where the aircraft has just departed from a runway, it is advantageous in some embodiments to select the runway from which the aircraft has just departed as the predicted runway. This is mainly because the next runway in front of the aircraft may be a considerable distance away and at a different elevation. By using the runway from which the aircraft just departed as the predicted runway, the ground proximity warning system can more accurately generate the terrain clearance floor used to warn the aircraft concerning ground proximity. After the aircraft has traveled some distance from the runway, the apparatus of the present invention will then predict a different runway.

To insure that the apparatus of the present invention predicts the runway from which the aircraft has just departed for use in ground proximity warning calculations, the track likelihood model illustrates an increasing likelihood value in the range of 165° to 180°. Since the aircraft has just departed from the runway, the aircraft will typically have a bearing deviation angle with respect to the runway that is in the range of 0° to 15° and a glideslope that is the range of 0° to 7°. Thus, the apparatus of the present invention will continue to identify the runway from which the aircraft has just departed for ground proximity calculations, including the generations of a terrain floor.

With reference to FIG. 6C, the glideslope likelihood model is illustrated mathematically as follows:

Glideslope Likelihood Model:

If Distance of Aircraft to Runway≧4 Nm
  Likelihood (Glideslope Angle Deviation)=1.0
Else If Glideslope Angle Deviation≦0.5°
  Likelihood (Glideslope Angle Deviation)=1.0
Else If Glideslope Angle Deviation≦3°
  Likelihood (Glideslope Angle Deviation)=(0.1/3.0)× Glideslope Deviation+1.0
Else If Glideslope Angle Deviation≦7°
  Likelihood (Glideslope Angle Deviation)=(−0.1/4.0)× Glideslope Deviation+1.175
Else
  Likelihood (Glideslope Angle Deviation)=0.0

As illustrated, the glideslope likelihood model represents an increased likelihood that an aircraft will land on a candidate runway when the glideslope deviation angle between the aircraft and the runway is in the range of 0° to 7°. This range of glideslopes is considered a typical glideslope range of angles for landing of most aircraft. For instance, most commercial aircraft use a 3° glideslope angle for landing, while most general aviation aircraft use glideslope angles in the range of 0° to 7°. As detailed in the above mathematical model, when the aircraft is more than 4 nautical miles (nm) from a candidate runway, a value of 1.0 is used for the glideslope likelihood value. The value of 1.0 is used, because as discussed later below, the glideslope likelihood value is typically combined with the bearing and track likelihood values in order to selectively amplify the overall likelihood value. Since an aircraft that is more than 4 nm from a runway may not have yet achieved a proper glideslope angle for landing, the value of 1.0 is used in predicting which candidate runway the aircraft will most likely land, such that the glideslope likelihood value does not amplify or otherwise affect the overall likelihood calculation when the aircraft is more than 4 nm from the candidate runway.

Additionally, in the range of 0° to 0.5°, the glideslope likelihood model generates a value of 1.0. As discussed above, the likelihood models are based on empirical data. Aircraft seldom land with a glideslope deviation angle in the range of 0° to 0.5°, and as such, empirical data in this glideslope deviation angle range would indicate that the aircraft is not landing on the runway. However, because an aircraft having a glideslope in this range is more likely landing on the candidate runway than not, a constant value of 1.0 is introduced into the glideslope likelihood model for glideslope deviation angles in the range of 0° to 0.5°.

FIGS. 6A–6C illustrate likelihood models according to one embodiment of the present invention. These likelihood models are shown for illustrative purposes and as such, do not limit the present invention to the use of different likelihood models. Specifically, these likelihood models may be tailored based on the type of aircraft that the present invention is implemented. Similarly, the likelihood models may be configured based on the particular airport that the aircraft is landing. In this embodiment, likelihood models for each type of aircraft and each airport can be stored in the memory device and retrieved for use by the present invention.

The present invention provides several apparatus, methods, and computer program products for predicting from at least two candidate runways, the runway that the aircraft is most likely to land. Specifically, the present invention provides several apparatus, methods, and computer program products that predict the runway that the aircraft is most likely landing based on a bearing, track, or glideslope deviation angle between the aircraft and a candidate runway. Further, the present invention provides several apparatus, methods, and computer program products that predict the runway that the aircraft is most likely landing based on a bearing, track, or glideslope likelihood value. Although the apparatus of the present invention may predict which runway an aircraft is most likely to land based on any one of the bearing, track, or glideslope values, in some embodiments it is advantageous to base the prediction of the runway on a combination of the bearing, track, and glideslope deviation angles.

Specifically, although an aircraft may have a bearing deviation angle with respect to a candidate runway that makes it likely that the aircraft is landing on the candidate runway, the aircraft may at the same time have either a track or glideslope deviation angle with respect to the candidate runway that decreases the likelihood that the aircraft is landing on the runway. For this reason, in some embodiments of the present invention the prediction of the runway is based on a combination of any two of the bearing, track, and glideslope likelihood values or all three of the reference deviation likelihood values.

Figure 7:
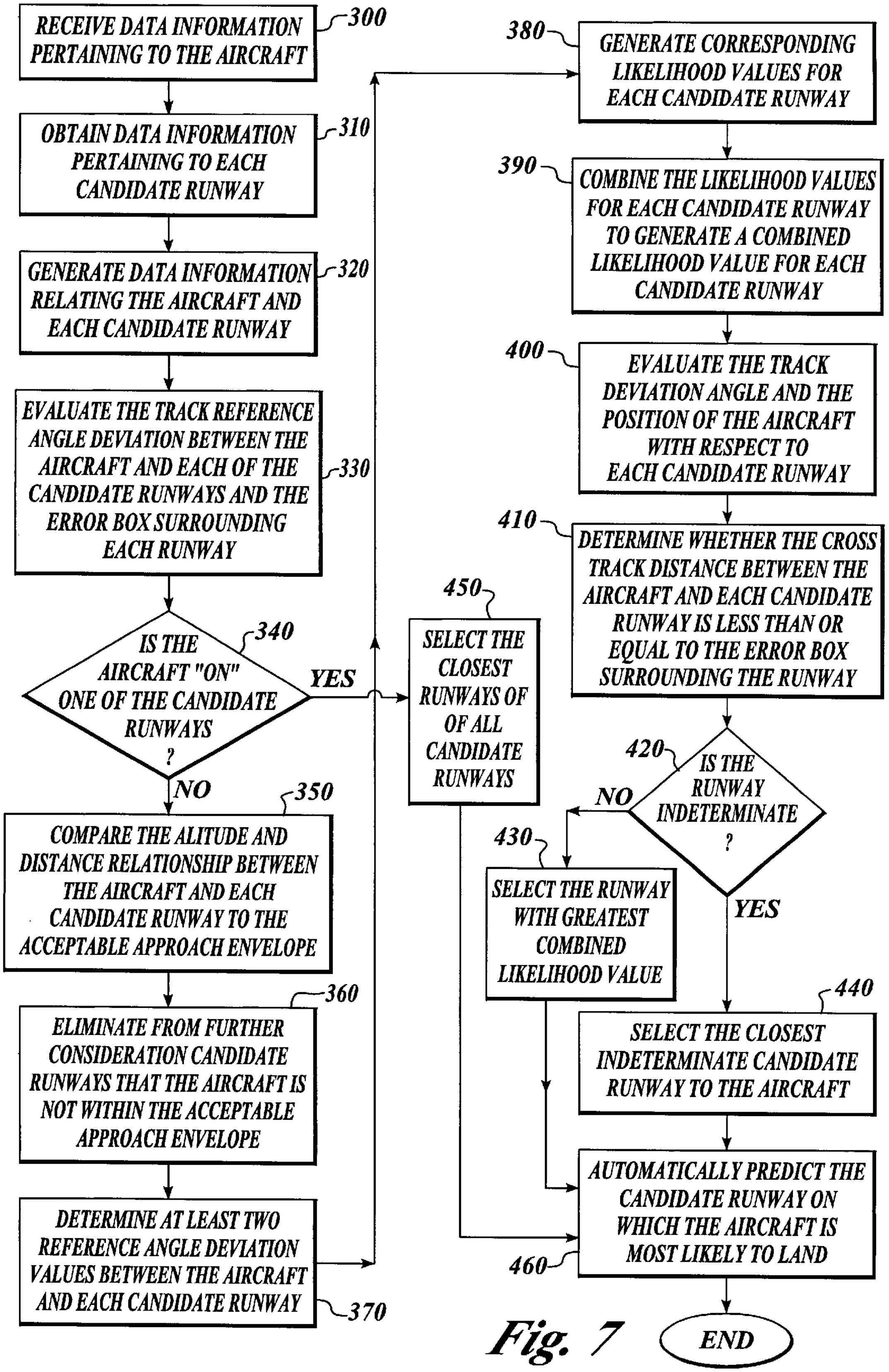
FIG. 7 is a block diagram of the operations performed to predict on which of at least two candidate runways that an aircraft is most likely to land using a likelihood value and acceptable approach envelope according to one embodiment of the present invention.

With reference to FIG. 7, an embodiment that combines either two or all of the likelihood values for each candidate runway together to determine which candidate runway is the runway that the aircraft is most likely to land is shown. In operation, the processor initially receives position information pertaining to the current position of the aircraft, (see step 300), and also accesses the memory device and obtains position information relating to the position of each candidate runway. (See step 310). Using the aircraft and candidate runway position information, the processor determines at least two reference deviation angle values, (i.e., at least two of the bearing, track, or glideslope angles), between the aircraft and each candidate runway. (See step 370). Next, the processor compares the reference deviation angles to their corresponding likelihood models and generates corresponding likelihood values for each candidate runway. (See step 380). Additionally, the processor combines the likelihood values to generate a combined likelihood value for each candidate runway. (See step 390). Based on the combined likelihood value associated with each candidate runway, the processor automatically predicts the candidate runway on which the aircraft is most likely to land. (See step 460). For instance, in one embodiment, the processor selects the candidate runway having the greatest combined likelihood value as the runway on which the aircraft is most likely to land. (See step 430).

As discussed above, in this embodiment, the processor combines the likelihood values associated with each candidate runway together to form a combined likelihood value. (See step 390). Depending on the embodiment, the likelihood values may be combined by addition, multiplication, or other procedures. For example, multiplication of the likelihood values may be advantageous as multiplication weights the likelihood values with respect to each other. Specifically, in instances where a first candidate runway has a large bearing likelihood value and a low track likelihood value, addition of the two likelihood values may indicate that this first candidate runway is more likely the runway on which the aircraft is landing than a second candidate runway that has a bearing and track likelihood value that are both relatively medium in value. However, when multiplication of the likelihood values is used, the lower track likelihood value of the first candidate runway will act to decrease the overall combined likelihood value for the first candidate runway, such that it may not have a large combined likelihood value relative to the second candidate runway.

Additionally, in instances where the processor determines a glideslope likelihood value for each candidate runway, the glideslope likelihood value may be used as a quality factor in the multiplication of the likelihood values. Specifically, if the processor determines a bearing and track likelihood value for each candidate runway that produces a high combined likelihood value that the aircraft is landing on the candidate runway, the glideslope likelihood value provides an added value to the prediction of which runway the aircraft is most likely to land. If the aircraft is within the 0° to 7° range with respect to the candidate runway, the glideslope likelihood value will be in the range of 1.0 to approximately 1.1, which when multiplied with the bearing and track values either increases or does not affect the combined likelihood value for the candidate runway. However, if the aircraft has a glideslope with respect to the candidate runway that is greater than 7° with respect to the candidate runway, the glideslope likelihood value is 0 and therefore, drives the combined likelihood value to zero indicating that the aircraft is not landing on the candidate runway.

The present invention provides several apparatus, methods, and computer program products for predicting from at least two candidate runways, the runway that the aircraft is most likely to land. Specifically, the present invention provides several apparatus, methods, and computer program products that predict which candidate runway that the aircraft is most likely to land based on either a bearing, track, or glideslope deviation angle between the aircraft and each candidate runway. These various embodiments predict which runway the aircraft is most likely to land based on the angular positional relationship between the aircraft and each candidate runway. Additional factors, however, in predicting which candidate runway the aircraft is most likely to land is the distance and altitude that the aircraft is from each candidate runway. Specifically, if the aircraft is a considerable altitude or distance from a candidate runway, it is less likely or indeterminable as to whether the aircraft is landing on the candidate runway. As such, in some embodiments, it is advantageous in addition to evaluating the angular position of the aircraft with respect to each candidate runway to also evaluate the altitude above and the distance from each candidate runway.

Figure 8:
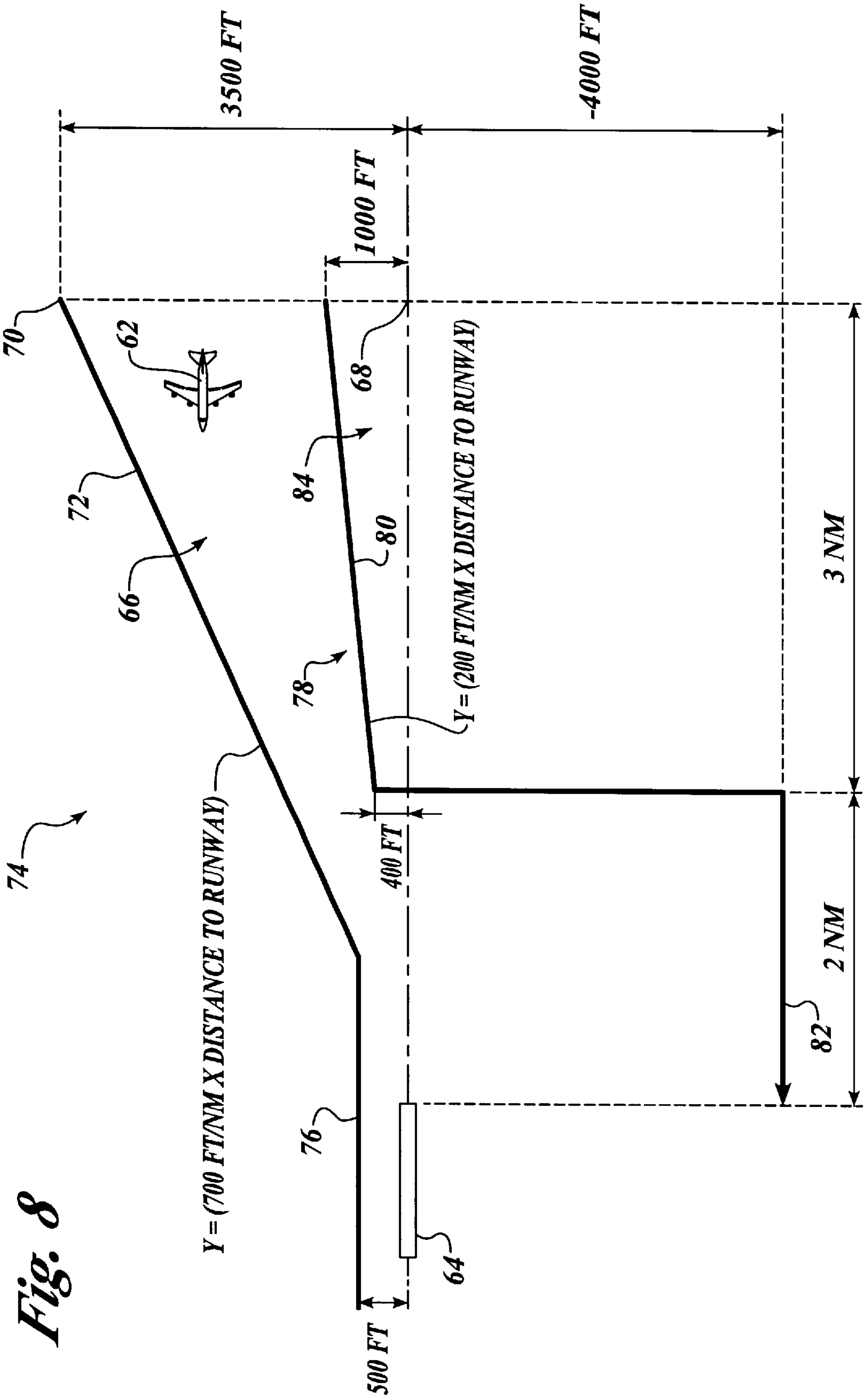
FIG. 8 is a plan view illustrating graphically an acceptable approach envelope that defines whether an aircraft is at an acceptable altitude and distance from a candidate runway according to one embodiment of the present invention.

With reference to FIG. 8, a predefined acceptable approach envelope that defines whether an aircraft is at an acceptable altitude and distance such that it is likely to land on a candidate runway according to one embodiment of the present invention is illustrated. This approach envelope details the altitude and distance parameters that an aircraft 62 must be in relation to a candidate runway 64 for the candidate runway to be considered. Specifically, the approach envelope 66 includes an outer distance boundary 68 that defines the maximum distance that an aircraft can be from a candidate runway before the candidate runway will be considered. The outer distance boundary is typically chosen based on the need to provide adequate alarm protection, while at the same time reduce the number of nuisance alarms generated. As shown in FIG. 8, in one embodiment the outer distance boundary is set at 5 nm, however, the value may have a varying range, with typical values from 5 to 12 nm.

The approach envelope also includes an upper altitude boundary 70. The upper altitude boundary defines the maximum altitude that an aircraft can be above a candidate runway and the candidate runway still be considered.

Within the outer distance and upper altitude boundary regions, the approach envelope 66 further includes an upper landing envelope ceiling 72. The upper ceiling 72 defines an upper glideslope angle, such that an aircraft in the region 74 above the upper ceiling is considered to be at too high an altitude above the candidate runway in relation to the distance the aircraft is from the candidate runway. The upper ceiling is typically defined with respect to a predefined altitude multiplied by the distance the aircraft is from the runway (i.e., Predefined Altitude×Distance to Runway), and in typical embodiments, the predefined altitude is 700 ft. The 700 ft predefined altitude is typically chosen as it represents the upper glideslope angle of 7°.

Specifically, the upper ceiling is defined in one embodiment as:

Ceiling=700 ft/nm×Distance to Runway
If Ceiling<500 ft
  Ceiling=500 feet.

Referring to the upper landing envelope ceiling 72, it may be noted that at a defined distance from the candidate runway, the upper ceiling has a flat or 0° slope portion 76. The flat slope portion of the upper ceiling may be included in some embodiments to account for instances where the aircraft may be engaged in a circling pattern prior to landing. In one example, aircraft will perform a circling pattern when the aircraft has been instructed to land in an opposite direction from the direction that the aircraft initially approaches the runway. In these instances, the aircraft will typically circle the runway within a certain altitude range that typically does not exceed an upper limit. As such, when the aircraft is at a predetermined range of altitudes above the runway and is within a predetermined distance range of the candidate runway, the aircraft may be performing a circling pattern, and as such, the candidate runway should not be eliminated from further consideration. As illustrated in FIG. 8, typical altitude ranges for the constant slope portion of the upper ceiling is approximately 500 ft.

Additionally, the landing envelope also includes a lower landing envelope floor 78. The landing envelope floor is comprised of first and second floor threshold values, 80 and 82, respectively. The first portion 80 of the landing envelope floor defines a lower glideslope angle, where an aircraft in the region 84 below the landing envelope floor is considered to have too low an altitude for the distance between the aircraft and the candidate runway for the aircraft to be landing on the runway. Similar to the upper ceiling, the slope of the first portion of the landing envelope floor is typically based on a predefined altitude multiplied by the distance the aircraft is from the runway. For instance in one embodiment, the first portion of the landing envelope floor may be defined by the line equation:

$$y=(200\ \text{ft/nm}\times\text{Distance to Runway})$$

and bounded by the ranges:

$$2\ \text{nm}\leqq x\leqq 5\ \text{nm}$$

and $$400\ \text{ft}\leqq y\leqq 1000\ \text{ft}$$

The second portion 82 of the landing envelope floor illustrates that as the aircraft nears the runway for landing it will be at an altitude bounded by the upper ceiling of the envelope and the runway. Although the second portion 82 of the landing envelope floor may be set at 0 ft to represent the runway, the second portion of the landing envelope floor is typically set at a value less than 0 ft to accommodate for positional and other types of errors. For instance, in the present embodiment, the lower portion 82 of the landing floor is set to −4000 ft for distances to the runway less than 2 nm (inner distance boundary) to account for positional errors associated with the aircraft and each candidate runway. The inner distance boundary is typically chosen based on the need to provide adequate alarm protection, while at the same time reducing the number of nuisance alarms generated. As shown in FIG. 8, in one embodiment the inner distance boundary is set at 2 nm, however, the value may have a varying range, with typical values from 0.5 to 2 nm.

As discussed above, the apparatus of the present invention compares the distance and altitude differences between the aircraft and each candidate runway and only further evaluates those candidate runways that are within an acceptable landing envelope, such as the envelope illustrated in FIG. 8. Specifically with reference to FIG. 7, the initial elimination of candidate runways that the aircraft is not positioned within the acceptable envelope from is illustrated.

In this embodiment of the present invention, the processor initially receives position information pertaining to the current position of the aircraft, (see step 300), and also accesses the memory device and obtains position information relating to the position of each candidate runway, such as the twenty-four nearest runways. (See step 310). The processor next generates data relating to the altitude of the aircraft above each candidate runway, the track of the aircraft, and position of the aircraft and each candidate runway and determine the speed of the aircraft. (See step 320). The processor next compares the altitude and distance relationship between the aircraft and each candidate runway to the acceptable approach envelope. (See step 350). Those candidate runways for which the aircraft is not within the acceptable approach envelope are eliminated from further consideration. (See step 360). For instance, if the aircraft is more than 5 nm from the candidate runway, the candidate runway is eliminated.

Using the aircraft and candidate runway position information, the processor next determines at least two reference deviation angle values, (i.e., at least two of bearing, track, or glideslope), between the aircraft and each candidate runway that was not eliminated. (See step 370). The processor compares the reference deviation angles to their corresponding likelihood models and generates corresponding likelihood values for each candidate runway. (See step 380). Additionally, the processor combines the likelihood values to generate a combined likelihood value for each candidate runway. (See step 390). Based on the combined likelihood value associated with each candidate runway, the processor automatically predicts the candidate runway on which the aircraft is most likely to land. (See step 460). For instance, in one embodiment, the processor selects the candidate runway having the greatest combined likelihood value as the runway on which the aircraft is most likely to land. (See step 430).

An additional factor not previously noted is the treatment of errors by the various apparatus, methods, and computer program products of the present invention. Specifically, there are associated accuracy errors both with the sensors used for sensing data relating to the aircraft and also errors associated with the position, elevation, and size of runways. Although not mentioned in the above embodiments, these error factors may be accounted for in the calculation of the reference deviation angle calculations. These errors are also accounted for during the prediction of the runway that the aircraft is most likely to land.

To account for these errors, the apparatus of the present invention, in some embodiments, may place an imaginary error box around each candidate runway. These imaginary error boxes may be different for each candidate runway based on data confidence factors related to each candidate runway. An error box is constructed around each candidate runway to address errors and uncertainties in data and measurements. It must be understood that the error box may be either two- or three-dimensional. Specifically, the error box may either represent only x and y coordinate positional errors (i.e., latitude and longitude errors) or in some embodiments, the error box may also account for z coordinate positional errors (i.e., errors in the altitude of the aircraft and elevation of the runway).

For example, in one embodiment of the present invention, the x and y coordinates of the error box may be defined by a Position Uncertainty Constant K. In this embodiment, K is defined as:

$$K=\text{Position Uncertainty (aircraft)}+\text{Runway Position Quality If } K<0.5\text{, then } K=0.5$$

With reference to the above equation, K includes a Position Uncertainty value representing errors associated with the indicated position of the aircraft and a Runway Position Quality value representing errors associated with the indicated position of the candidate runway. In this embodiment of the present invention, the Runway Position Quality is typically a stored value. The Position Uncertainty value associated with the aircraft may be either a stored value or a calculated value based on the navigation systems used and time since last position update. As a conservative factor, if the Position Uncertainty value is=0, the apparatus of the present invention may use a value of 0.6 for error calculations.

In some embodiments, the error box may also include a z coordinate defining a height error above the candidate runway. This z coordinate is typically a selected height above the runway based on quality factors associated with the precision of the altitude measurement device of the aircraft and the stored elevation values for the candidate runway. For typical embodiments, the z coordinate of the error box is selected as 300 ft.

As detailed above, in one embodiment, the present invention creates an error box around each candidate runway for use in predicting which of the candidate runways the aircraft is most likely to land. This error box may be used to correct the calculations of bearing, track, and glideslope angle deviations previously discussed. In addition, the error box may be used in the prediction of the runway on which the aircraft is most likely to land. The error box may also be used in the embodiments discussed below relating to the "on runway" and indeterminate runway conditions.

As mentioned above, the processor of the present invention, based on the combined likelihood value associated with each candidate runway, automatically predicts the candidate runway on which the aircraft is most likely to land. (See step 460). In this regard, the apparatus of the present invention determines various reference angle deviations between the aircraft and each candidate runway and uses these reference angle deviations to predict the runway. In many instances, the candidate runway having the greatest combined likelihood value is typically selected as the runway on which the aircraft is most likely to land. (See step 430). However, in some instances the prediction of the candidate runway may not be straight forward.

Specifically, the aircraft may be located very near or "on" one of the candidate runways or the aircraft may be positioned with regards to several of the candidate runways such that it is initially difficult to predict which of the candidate runways on which the aircraft is most likely to land, (i.e., indeterminate). In these instances, the processor may not select the candidate runway having the greatest likelihood value as the candidate runway on which the aircraft is most likely to land. Instead, the processor may select the closest runway to the aircraft in the instance where the aircraft in "on" a runway or the processor may select the closest of the indeterminate runways if the aircraft is positioned such that it is indeterminate on which runway the aircraft is landing.

For instance, the aircraft may be located either "on" or very near a candidate runway, such as in the instance when the aircraft is taxiing for take off and landing or when the aircraft is at the terminal. In these instances, it is typically advantageous for the apparatus of the present invention to select the candidate runway on which the aircraft is present as the predicted runway for ground proximity warning calculations. With reference to FIG. 7, in this embodiment of the present invention, after the processor has generated data relating to the altitude of the aircraft above each candidate runway, the track of the aircraft, and position of the aircraft with respect to each candidate runway, (see step 320), the processor initially evaluates the track reference angle deviation between the aircraft and each of the candidate runways and the error box surrounding each candidate runway to determine whether the aircraft is considered "on" one of the candidate runways. (See step 330).

Specifically, the processor of the present invention evaluates the position of the aircraft in relation to each candidate runway as follows:

1) |Height Above Runway|<300 ft;

2) Track Reference Angle Deviation<15°;

3) |Cross Track Distance|<Position Uncertainty Constant K, where Cross Track Distance=Distance to Runway×Sin (Bearing Reference Angle Deviation); and 4) Runway Half Length<Along Track Distance<Position Uncertainty Constant K, where Along Track Distance=Distance to Runway*Cos (Bearing Reference Angle Deviation); and Runway Half Length=half of the length of the runway.

If the position of the aircraft is within the above defined ranges from a candidate runway, (see step 340), it is determined that the aircraft is "on" the runway. In this embodiment, the processor selects the closest runway to the aircraft as the runway for ground proximity calculations. (See step 450). If the position of the aircraft with respect to the candidate runways does not meet the "on runway" criteria, the processor evaluates the candidate runways as discussed previously.

In other instances, the aircraft may be positioned in relation to several of the candidate runways, such that several of the candidate runways appear to be likely candidates on which the aircraft may land. In these instances, the runway on which the aircraft is most likely to land is considered indeterminate. When the prediction of the runway is considered indeterminate, the processor of the present invention selects one of the indeterminate candidate runways as the runway that the aircraft is most likely to land for use in ground proximity warning calculations.

With reference to FIG. 7, in this embodiment of the present invention, after the processor has generated likelihood values for each of the candidate runways, (see steps 370–390), the processor next evaluates each of the candidate runways to determine if the prediction of the runway is indeterminate. Specifically, the processor of this embodiment evaluates the track deviation angle and the position of the aircraft with respect to each candidate runway. The processor first evaluates each candidate runway and determines whether the track deviation angle between the candidate runway and the aircraft is within the following range:

$$\text{Track Deviation Angle} \leqq 15°$$

or $$\text{Track Deviation Angle} \geqq 165°$$

(See step 400).

Additionally, the processor also determines whether the cross track distance between the aircraft and each candidate runway is less than or equal to the error box that surrounds the runway. (See step 410). Specifically, the apparatus of the present invention calculates the Cross Track Distance between the aircraft and each candidate runway using the equation below:

Cross Track Distance=Distance to Runway×Sin(Bearing Dev. Angle) This Cross Track Distance is then compared to the positional error uncertainties constant K.

$$\text{Cross Track Distance} \leqq K$$

Those candidate runways having associated track deviations angles that are less than or equal to 15° and greater than or equal to 165° and a Cross Track Distance less than or equal to K are considered indeterminate candidate runways by the processor. (See step 420).

If the processor determines that at least two of the candidate runways meet the indeterminate criteria, the processor selects from the indeterminate candidate runways the indeterminate candidate runway that is closest to the aircraft. (See step 440). The processor selects the closest indeterminate candidate runway as the runway on which the aircraft is most likely to land. This selected, indeterminate candidate runway is then used in ground proximity warning calculations. (See step 460).

As detailed above, the apparatus of the present invention may determine whether the aircraft is "on" a candidate runway or that the prediction of the runway is indeterminate. Although the apparatus of the present invention may evaluate each candidate runway as one positional point (i.e., the center point of the runway), in some embodiments of the present invention, it is preferred to evaluate both endpoints of each candidate runway individually. Specifically, the end points of each candidate runway may have different angular relationships with respect to the position of the aircraft, and as such, it may be advantageous to evaluate each end point separately.

As discussed, the apparatus of the present invention typically operates at all times to predict a runway from a group of candidate runways on which the aircraft is most likely to land. In some instances, the apparatus may be operating when the aircraft is not in flight, such as when the aircraft is at the terminal or on the tarmac awaiting takeoff. If the aircraft is not in flight, it may be advantageous to forgo the prediction routine. As such, in one embodiment of the present invention, the apparatus of the present invention initially evaluates the speed of the aircraft to determine if the aircraft is in flight. If the speed of the aircraft is below the in-flight threshold, the apparatus determines that the aircraft is not in flight. In this instance, the apparatus will predict the runway on which the aircraft is located using the "on runway" criteria. For instance, in one embodiment of the present invention, if the speed of the aircraft is less than 60 knots, the apparatus determines that the aircraft is not in flight and selects the runway on which the aircraft is located or near.

In addition to providing apparatus and methods, the present invention also provides computer program products for predicting which runway from at least two candidate runways that the aircraft is most likely to land. The computer program products have a computer readable storage medium having computer readable program code means embodied in the medium. With reference to FIG. 1, the computer readable storage medium may be part of the memory device 24, and the processor 12 of the present invention may implement the computer readable program code means to predict the runway on which the aircraft is most likely to land as described in the various embodiments above.

The computer-readable program code means includes first computer-readable program code means for determining a reference angle deviation between the aircraft and each candidate runway Further, the computer-readable program code means also includes second computer-readable program code means for predicting the runway on which the aircraft is most likely to land based on the reference angle deviation determined from the first computer-readable program code means.

With reference to the first computer-readable program code means, as discussed previously with respect to the various apparatus and methods of the present invention, the first computer-readable program code means may determine different angular relationships between the aircraft and each candidate runway. For instance, the first computer-readable program code means may determine a bearing, track, and/or glideslope deviation angle between the aircraft and each candidate runway.

With reference to the second computer-readable program code means, as discussed previously with respect to the various apparatus and methods of the present invention, the second computer-readable program code means may predict the runway on which the aircraft is most likely to land based on several criteria. Specifically, in one embodiment of the present invention, the second computer-readable program code means predicts the runway based on either one or a combination of the angle deviation values (i.e., bearing, track, and glideslope) determined by the first computer-readable program code means.

In another embodiment of the present invention, the second computer-readable program code means may predict the runway based on empirical models. Specifically, the first computer-readable program code means may include computer readable program code means for determining a likelihood value for each candidate runway representative of the likelihood that the aircraft will land on the respective candidate runway based upon a predetermined likelihood model. In this embodiment of the present invention, the second computer-readable program code means may include computer readable program code means for predicting the runway on which the aircraft is most likely to land based on the likelihood value associated with each candidate runway.

In this regard, FIGS. 1, 2, and 7 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for predicting which one of at least two candidate runways on which an aircraft is most likely to land, wherein said apparatus comprises a processor that determines a reference angle deviation between the aircraft and each candidate runway, and wherein said processor automatically predicts the candidate runway on which the aircraft is most likely to land based on the reference angle deviation.

2. An apparatus according to claim 1, wherein the reference angle deviation is a bearing angle deviation representative of an angle of deviation between the position of the aircraft and the position of each candidate runway, wherein said processor determines the bearing angle deviation for each candidate runway, and wherein said processor predicts the runway on which the aircraft is most likely to land based on the bearing angle deviation associated with each candidate runway.

3. An apparatus according to claim 1, wherein the reference angle deviation is a track angle deviation representative of an angle of deviation between a direction in which the aircraft is flying and a direction in which each candidate runway extends lengthwise, wherein said processor determines the track angle deviation for each candidate runway, and wherein said processor predicts the runway on which the aircraft is most likely to land based on the track angle deviation associated with each candidate runway.

4. An apparatus according to claim 1, wherein the reference angle deviation is a glideslope angle deviation representative of a vertical angle of deviation between the position of the aircraft and each candidate runway, wherein said processor determines the glideslope angle deviation for each candidate runway, and wherein said processor predicts the runway on which the aircraft is most likely to land based on the glideslope angle deviation associated with each candidate runway.

5. An apparatus according to claim 1, wherein said processor determines a landing likelihood value for each candidate runway representative of the likelihood that the aircraft will land on the respective candidate runway based upon a predetermined likelihood model defining the relationship between the likelihood that an aircraft will land on a runway and the reference angle between the aircraft and the runway.

6. An apparatus according to claim 5, wherein said processor predicts the runway on which the aircraft is most likely to land as the candidate runway having the greatest associated landing likelihood value.

7. An apparatus according to claim 5, wherein said processor predicts that the aircraft is positioned on a candidate runway if the reference angle deviation between the aircraft and one of the candidate runways is within an on runway angle deviation range and a position of the aircraft is within an error box constructed about the candidate runway.

8. An apparatus according to claim 7, wherein said processor determines that a candidate runway is indeterminate if the track deviation angle between the aircraft and the candidate runway is within an indeterminate runway track angle deviation range and a cross track distance between the aircraft and the candidate runway is within an error box constructed about the candidate runway.

9. An apparatus according to claim 8, wherein if said processor determines that at least two of the candidate runways are indeterminate and that the aircraft is not located on one of the candidate runways, said processor selects the indeterminate candidate runway that is closest to the aircraft.

10. An apparatus according to claim 5, wherein the landing likelihood value is a bearing likelihood value representative of the likelihood that the aircraft will land on the respective candidate runway based upon a predetermined bearing likelihood model defining the relationship between the likelihood that an aircraft will land on a runway and a bearing angle of deviation between the position of the aircraft and the position of the runway, wherein said processor determines a bearing likelihood value for each candidate runway, and wherein said processor predicts the runway on which the aircraft is most likely to land based on the bearing likelihood value associated with each candidate runway.

11. An apparatus according to claim 5, wherein the landing likelihood value is a track likelihood value representative of the likelihood that the aircraft will land on the respective candidate runway based upon a predetermined track likelihood model defining the relationship between the likelihood that an aircraft will land on a runway and a track angle of deviation between a direction in which the aircraft is moving and a direction in which each runway extends lengthwise, wherein said processor determines a track likelihood value for each candidate runway, and wherein said processor predicts the runway on which the aircraft is most likely to land based on the track likelihood value associated with each candidate runway.

12. An apparatus according to claim 5, wherein the landing likelihood value is a glideslope likelihood value representative of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said processor determines a glideslope likelihood value for each candidate runway, and wherein said processor predicts the runway on which the aircraft is most likely to land based on the glideslope likelihood value associated with each candidate runway.

13. An apparatus according to claim 5, wherein a bearing likelihood value represents the likelihood that an aircraft will land on a candidate runway based on a bearing angle of deviation between the position of the aircraft and the position of the candidate runway and a track likelihood value represents the likelihood that an aircraft will land on a candidate runway based on a track angle of deviation between a direction in which the aircraft is moving and a direction in which each runway extends lengthwise, wherein said processor determines a combined landing likelihood value for each candidate runway by combining the bearing and track likelihood values for each candidate runway, and wherein said processor predicts the runway on which the aircraft is most likely to land based on the combined landing likelihood value associated with each runway.

14. An apparatus according to claim 13, wherein said processor determines a combined landing likelihood value for each candidate runway by multiplying the bearing and track likelihood values for each candidate runway.

15. An apparatus according to claim 13, wherein said processor determines a combined landing likelihood value for each candidate runway by adding the bearing and track likelihood values for each candidate runway.

16. An apparatus according to claim 13, wherein a glideslope likelihood value represents of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said processor determines a combined landing likelihood value for each candidate runway by combining the bearing, track, and glideslope likelihood values for each candidate runway, and wherein said processor predicts the runway on which the aircraft is most likely to land based on the combined landing likelihood value associated with each runway.

17. An apparatus according to claim 16, wherein said processor determines a combined landing likelihood value for each candidate runway by multiplying the bearing, track, and glideslope likelihood values for each candidate runway.

18. An apparatus according to claim 16, wherein said processor determines a combined landing likelihood value for each candidate runway by adding the bearing, track, and glideslope likelihood values for each candidate runway.

19. An apparatus according to claim 1, wherein said processor compares the position and altitude of the aircraft in relation to each candidate runway to a predefined acceptable approach envelope, and wherein said processor identifies candidate runways on which the aircraft is more likely to land as those runways in which the aircraft is positioned within the predefined acceptable approach envelope in relation to the candidate runway.

20. A method for predicting which one of at least two candidate runways on which an aircraft is most likely to land, wherein said method comprises the steps of:

determining a reference angle deviation between the aircraft and each candidate runway; and automatically predicting the candidate runway on which the aircraft is most likely to land based on the reference angle deviation.

21. A method according to claim 20, wherein the reference angle deviation is a bearing angle deviation representative of an angle of deviation between the position of the aircraft and the position of each candidate runway, wherein said determining step comprises determining the bearing angle deviation for each candidate runway, and wherein said predicting step comprises predicting the runway on which the aircraft is most likely to land based on the bearing angle deviation associated with each candidate runway.

22. A method according to claim 20, wherein the reference angle deviation is a track angle deviation representative of an angle of deviation between a direction in which the aircraft is flying and a direction in which each candidate runway extends lengthwise, wherein said determining step comprises determining the track angle deviation for each candidate runway, and wherein said predicting step comprises predicting the runway on which the aircraft is most likely to land based on the track angle deviation associated with each candidate runway.

23. A method according to claim 20, wherein the reference angle deviation is a glideslope angle deviation representative of a vertical angle of deviation between the position of the aircraft and each candidate runway, wherein said determining step comprises determining the glideslope angle deviation for each candidate runway, and wherein said predicting step comprises predicting the runway on which the aircraft is most likely to land based on the glideslope angle deviation associated with each candidate runway.

24. A method according to claim 20, wherein said determining step comprises determining a landing likelihood value for each candidate runway representative of the likelihood that the aircraft will land on the respective candidate runway based upon a predetermined likelihood model defining the relationship between the likelihood that an aircraft will land on a runway and the reference angle between the aircraft and the runway.

25. A method according to claim 24, wherein said predicting step comprises predicting the runway on which the aircraft is most likely to land as the candidate runway having the greatest associated landing likelihood value.

26. A method according to claim 24, wherein said predicting step predicts that the aircraft is positioned on a candidate runway if the reference angle deviation between the aircraft and one of the candidate runways is within an on runway angle deviation range and a position of the aircraft is within an error box constructed about the candidate runway.

27. A method according to claim 26, wherein said determining step further comprises determining a track deviation angle between the aircraft and the candidate runway and a cross track distance between the aircraft and the candidate runway, and wherein said predicting step comprises predicting that a candidate runway is indeterminate if the track deviation angle between the aircraft and the candidate runway is within an indeterminate runway track angle deviation range and a cross track distance between the aircraft and the candidate runway is within an error box constructed about the candidate runway.

28. A method according to claim 27, wherein if said predicting step predicts that at least two of the candidate runways are indeterminate and that the aircraft is not located on one of the candidate runways, said predicting step predicts the indeterminate candidate runway that is closest to the aircraft as the runway the on which the aircraft is most likely to land.

29. A method according to claim 24, wherein the landing likelihood value is a bearing likelihood value representative of the likelihood that the aircraft will land on the respective candidate runway based upon a predetermined bearing likelihood model defining the relationship between the likelihood that an aircraft will land on a runway and a bearing angle of deviation between the position of the aircraft and the position of the runway, wherein said determining step comprises determining a bearing likelihood value for each candidate runway, and wherein said predicting step comprises predicting the runway on which the aircraft is most likely to land based on the bearing likelihood value associated with each candidate runway.

30. A method according to claim 24, wherein the landing likelihood value is a track likelihood value representative of the likelihood that the aircraft will land on the respective candidate runway based upon a predetermined track likelihood model defining the relationship between the likelihood that an aircraft will land on a runway and a track angle of deviation between a direction in which the aircraft is flying and a direction in which each runway extends lengthwise, wherein said determining step comprises determining a track likelihood value for each candidate runway, and wherein said predicting step comprises predicting the runway on which the aircraft is most likely to land based on the track likelihood value associated with each candidate runway.

31. A method according to claim 24, wherein a glideslope likelihood value represents the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said determining step comprises determining a glideslope likelihood value for each candidate runway, and wherein said predicting step comprises predicting the runway on which the aircraft is most likely to land based on the glideslope likelihood value associated with each candidate runway.

32. A method according to claim 24, wherein a bearing likelihood value represents the likelihood that an aircraft will land on a candidate runway based on a bearing angle of deviation between the position of the aircraft and the position of the candidate runway and a track likelihood value represents the likelihood that an aircraft will land on a candidate runway based on a track angle of deviation between a direction in which the aircraft is moving and a direction in which each runway extends lengthwise, wherein said determining step comprises combining the bearing and track likelihood values for each candidate runway to thereby determine a combined landing likelihood value for each candidate runway, and wherein said predicting step comprises predicting the runway on which the aircraft is most likely to land based on the combined landing likelihood value associated with each runway.

33. A method according to claim 32, wherein said determining step comprises multiplying the bearing and track likelihood values for each candidate runway to thereby determine a combined landing likelihood value for each candidate runway.

34. A method according to claim 32, wherein said determining step comprises adding the bearing and track likelihood values for each candidate runway to thereby determine a combined landing likelihood value for each candidate runway.

35. A method according to claim 32, wherein a glideslope likelihood value represents of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said determining step comprises combining the bearing, track, and glideslope likelihood values for each candidate runway to thereby determine a combined landing likelihood value for each candidate runway, and wherein said predicting step comprises predicting the runway on which the aircraft is most likely to land based on the combined landing likelihood value associated with each runway.

36. A method according to claim 35, wherein said determining step comprises multiplying the bearing, track, and glideslope likelihood values for each candidate runway to thereby determine a combined landing likelihood value for each candidate runway.

37. A method according to claim 35, wherein said determining step comprises adding the bearing, track, and glideslope likelihood values for each candidate runway to thereby determine a combined landing likelihood value for each candidate runway.

38. A method according to claim 20 further comprising the step of comparing the position and altitude of the aircraft in relation to each candidate runway to a predefined acceptable approach envelope, and wherein said predicting step further comprises the step of identifying candidate runways on which the aircraft is more likely to land as those runways in which the aircraft is positioned within the predefined acceptable approach envelope in relation to the candidate runway.

39. A system for predicting which one of at least two candidate runways on which an aircraft is most likely to land, wherein said system comprises:

- a sensor that receives data representative of the position of the aircraft;
- a memory device containing data representative of the positions of at least two candidate runways; and
- a processor in electrical communication with said sensor and said memory device, wherein said processor determines a reference angle deviation between the aircraft and each candidate runway, and wherein said processor predicts the runway on which the aircraft is most likely to land based on the reference angle deviation.

40. A system according to claim 39, wherein the reference angle deviation is a bearing angle deviation representative of an angle of deviation between the position of the aircraft and the position of each candidate runway, wherein said processor determines the bearing angle deviation for each candidate runway, and wherein said processor predicts the runway on which the aircraft is most likely to land based on the bearing angle deviation associated with each candidate runway.

41. A system according to claim 39, wherein the reference angle deviation is a track angle deviation representative of an angle of deviation between a direction in which the aircraft is flying and a direction in which each candidate runway extends lengthwise, wherein said processor determines the track angle deviation for each candidate runway, and wherein said processor predicts the runway on which the aircraft is most likely to land based on the track angle deviation associated with each candidate runway.

42. A system according to claim 39, wherein the reference angle deviation is a glideslope angle deviation representative of a vertical angle of deviation between the position of the aircraft and each candidate runway, wherein said processor determines the glideslope angle deviation for each candidate runway, and wherein said processor predicts the runway on which the aircraft is most likely to land based on the glideslope angle deviation associated with each candidate runway.

43. A system according to claim 39, wherein said processor determines a landing likelihood value for each candidate runway representative of the likelihood that the aircraft will land on the respective candidate runway based upon a predetermined likelihood model defining the relationship between the likelihood that an aircraft will land on a runway and the reference angle between the aircraft and the runway.

44. A system according to claim 43, wherein said processor predicts the runway on which the aircraft is most likely to land as the candidate runway having the greatest associated landing likelihood value.

45. A system according to claim 43, wherein said processor predicts that the aircraft is positioned on a candidate runway if the reference angle deviation between the aircraft and one of the candidate runways is within an on runway angle deviation range and a position of the aircraft is within an error box constructed about the candidate runway.

46. A system according to claim 45, wherein said processor determines that a candidate runway is indeterminate if the track deviation angle between the aircraft and the candidate runway is within an indeterminate runway track angle deviation range and a cross track distance between the aircraft and the candidate runway is within an error box constructed about the candidate runway.

47. A system according to claim 46, wherein if said processor determines that at least two the candidate runways are indeterminate and that the aircraft is not located on one of the candidate runways, said processor selects the indeterminate candidate runway that is closes to the aircraft.

48. A system according to claim 43, wherein the landing likelihood value is a bearing likelihood value representative of the likelihood that the aircraft will land on the respective candidate runway based upon a predetermined bearing likelihood model defining the relationship between the likelihood that an aircraft will land on a runway and a bearing angle of deviation between the position of the aircraft and the position of the runway, wherein said processor determines a bearing likelihood value for each candidate runway, and wherein said processor predicts the runway on which the aircraft is most likely to land based on the bearing likelihood value associated with each candidate runway.

49. A system according to claim 43, wherein the landing likelihood value is a track likelihood value representative of the likelihood that the aircraft will land on the respective candidate runway based upon a predetermined track likelihood model defining the relationship between the likelihood that an aircraft will land on a runway and a track angle of deviation between a direction in which the aircraft is moving and a direction in which each runway extends lengthwise, wherein said processor determines a track likelihood value for each candidate runway, and wherein said processor predicts the runway on which the aircraft is most likely to land based on the track likelihood value associated with each candidate runway.

50. A system according to claim 43, wherein the landing likelihood value is a glideslope likelihood value representative of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said processor determines a glideslope likelihood value for each candidate runway, and wherein said processor predicts the runway on which the aircraft is most likely to land based on the glideslope likelihood value associated with each candidate runway.

51. A system according to claim 43, wherein a bearing likelihood value represents the likelihood that an aircraft will land on a candidate runway based on a bearing angle of deviation between the position of the aircraft and the position of the candidate runway and a track likelihood value represents the likelihood that an aircraft will land on a candidate runway based on a track angle of deviation between a direction in which the aircraft is moving and a direction in which each runway extends lengthwise, wherein said processor determines a combined landing likelihood value for each candidate runway by combining the bearing and track likelihood values for each candidate runway, and wherein said processor predicts the runway on which the aircraft is most likely to land based on the combined landing likelihood value associated with each runway.

52. A system according to claim 51, wherein a glideslope likelihood value represents of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said processor combines the bearing, track, and glideslope likelihood values for each candidate runway to thereby determine a combined landing likelihood value for each candidate runway, and wherein said processor predicts the runway on which the aircraft is most likely to land based on the combined landing likelihood value associated with each runway.

53. A computer program product for predicting which one of at least two candidate runways on which an aircraft is most likely to land, wherein the computer program product comprises:

a computer readable storage medium having computer readable program code means embodied in said medium, said computer-readable program code means comprising:

first computer-readable program code means for determining a reference angle deviation between the aircraft and each candidate runway; and second computer-readable program code means for predicting the runway on which the aircraft is most likely to land based on the reference angle deviation.

54. A computer program product as defined in claim 53, wherein the reference angle deviation is a bearing angle deviation representative of an angle of deviation between the position of the aircraft and the position of each candidate runway, wherein said first computer-readable program code means comprises computer readable program code means for determining the bearing angle deviation for each candidate runway, and wherein said second computer-readable program code means comprises computer readable program code means for predicting the runway on which the aircraft is most likely to land based on the bearing angle deviation associated with each candidate runway.

55. A computer program product as defined in claim 53, wherein the reference angle deviation is a track angle deviation representative of an angle of deviation between a direction in which the aircraft is flying and a direction in which each candidate runway extends lengthwise, wherein said first computer-readable program code means comprises computer readable program code means for determining the track angle deviation for each candidate runway, and wherein said second computer-readable program code means comprises computer readable program code means for predicting the runway on which the aircraft is most likely to land based on the track angle deviation associated with each candidate runway.

56. A computer program product as defined in claim 53, wherein the reference angle deviation is a glideslope angle deviation representative of a vertical angle of deviation between the position of the aircraft and each candidate runway, wherein said first computer-readable program code means comprises computer readable program code means for determining the glideslope angle deviation for each candidate runway, and wherein said second computer-readable program code means comprises computer readable program code means for predicting the runway on which the aircraft is most likely to land based on the glideslope angle deviation associated with each candidate runway.

57. A computer program product as defined in claim 53, wherein said first computer-readable program code means comprises computer readable program code means for determining a landing likelihood value for each candidate runway representative of the likelihood that the aircraft will land on the respective candidate runway based upon a predetermined likelihood model defining the relationship between the likelihood that an aircraft will land on a runway and the reference angle between the aircraft and the runway.

58. A computer program product as defined in claim 57, wherein the landing likelihood value is a bearing likelihood value representative of the likelihood that the aircraft will land on the respective candidate runway based upon a predetermined bearing likelihood model defining the relationship between the likelihood that an aircraft will land on a runway and a bearing angle of deviation between the position of the aircraft and the position of the runway, wherein said first computer-readable program code means comprises computer readable program code means for determining a bearing likelihood value for each candidate runway, and wherein said second computer-readable program code means comprises computer readable program code means for predicting the runway on which the aircraft is most likely to land based on the bearing likelihood value associated with each candidate runway.

59. A computer program product as defined in claim 57, wherein the landing likelihood value is a track likelihood value representative of the likelihood that the aircraft will land on the respective candidate runway based upon a predetermined track likelihood model defining the relationship between the likelihood that an aircraft will land on a runway and a track angle of deviation between a direction in which the aircraft is moving and a direction in which each runway extends lengthwise, wherein said first computer-readable program code means comprises computer readable program code means for determining a track likelihood value for each candidate runway, and wherein said second computer-readable program code means comprises computer readable program code means for predicting the runway on which the aircraft is most likely to land based on the track likelihood value associated with each candidate runway.

60. A computer program product as defined in claim 57, wherein the landing likelihood value is a glideslope likelihood value representative of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said first computer-readable program code means comprises computer readable program code means for determining a glideslope likelihood value for each candidate runway, and wherein said second computer-readable program code means comprises computer readable program code means for predicting the runway on which the aircraft is most likely to land based on the glideslope likelihood value associated with each candidate runway.

61. A computer program product as defined in claim 57, wherein a bearing likelihood value represents the likelihood that an aircraft will land on a candidate runway based on a bearing angle of deviation between the position of the aircraft and the position of the candidate runway and a track likelihood value represents the likelihood that an aircraft will land on a runway based on a track angle of deviation between a direction in which the aircraft is moving and a direction in which each runway extends lengthwise, wherein said first computer-readable program code means comprises computer readable program code means for determining a combined landing likelihood value for each candidate runway by combining the bearing and track likelihood values for each candidate runway, and wherein said second computer-readable program code means comprises computer readable program code means for predicting the runway on which the aircraft is most likely to land based on the combined landing likelihood value associated with each runway.

62. A computer program product as defined in claim 61, wherein a glideslope likelihood value represents of the likelihood that the aircraft will land on the respective candidate runway based upon a predetermined glideslope likelihood model defining the relationship between the likelihood that an aircraft will land on a runway and a glideslope angle of deviation representative of a vertical angle of deviation between the position of the aircraft and each candidate runway, wherein said first computer-readable program code means comprises computer readable program code means for combining the bearing, track, and glideslope likelihood values for each candidate runway to thereby determine a combined landing likelihood value for each candidate runway, and wherein said second computer-readable program code means comprises computer readable program code means for predicting the runway on which the aircraft is most likely to land based on the combined landing likelihood value associated with each runway.

63. A computer program product as defined in claim 62, wherein said first computer-readable program code means comprises computer readable program code means for multiplying the bearing, track, and glideslope likelihood values for each candidate runway to thereby determine a combined landing likelihood value for each candidate runway, and wherein said second computer-readable program code means comprises computer readable program code means for predicting the runway on which the aircraft is most likely to land based on the combined landing likelihood value associated with each runway.

64. A computer program product as defined in claim 62, wherein said first computer-readable program code means comprises computer readable program code means for adding the bearing, track, and glideslope likelihood values for each candidate runway to thereby determine a combined landing likelihood value for each candidate runway, and wherein said second computer-readable program code means comprises computer readable program code means for predicting the runway on which the aircraft is most likely to land based on the combined landing likelihood value associated with each runway.

* * * * *